US012401160B2

(12) United States Patent
Yang et al.

(10) Patent No.: US 12,401,160 B2
(45) Date of Patent: Aug. 26, 2025

(54) CONNECTOR AND CONNECTOR ASSEMBLY

(71) Applicant: Tyco Electronics (Shanghai) Co., Ltd., Shanghai (CN)

(72) Inventors: Yuchen Yang, Shanghai (CN); Xiao (Nichee) Zhou, Shanghai (CN); Kaixuan (Evan) Jiang, Shanghai (CN); Ziwei (Vivi) Li, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 350 days.

(21) Appl. No.: 18/181,188

(22) Filed: Mar. 9, 2023

(65) Prior Publication Data

US 2023/0307864 A1 Sep. 28, 2023

(30) Foreign Application Priority Data

Mar. 9, 2022 (CN) ......................... 202210225027.5
Mar. 9, 2022 (CN) ......................... 202220496338.0

(51) Int. Cl.
*H01R 13/641* (2006.01)
*H01R 13/621* (2006.01)

(52) U.S. Cl.
CPC ....... *H01R 13/641* (2013.01); *H01R 13/6215* (2013.01)

(58) Field of Classification Search
None
See application file for complete search history.

(56) References Cited

U.S. PATENT DOCUMENTS 6,419,522 B1 * 7/2002 Bonilla ................ H01R 13/506 439/468
7,270,562 B1 * 9/2007 Trout ................. H01R 13/6215 439/364
7,524,215 B2 * 4/2009 Banas .................. H01R 13/506 439/465
7,625,229 B2 * 12/2009 Cross ................. H01R 13/5202 439/468
8,052,481 B2 * 11/2011 Azad .................. H01R 13/6215 439/695
8,177,576 B2 * 5/2012 Zhou .................. H01R 13/6215 439/372
9,059,540 B2 * 6/2015 Menez ................. H01R 13/641
9,105,998 B2 * 8/2015 Uno .................... H01R 13/6315
10,211,570 B2 * 2/2019 Tanaka ............... H01R 13/6215
11,223,157 B2 * 1/2022 Nakano .............. H01R 13/5219
11,322,880 B2 * 5/2022 Tanaka ............... H01R 13/5202
11,699,885 B1 * 7/2023 Pavlovic ............ H01R 13/6581 235/451

(Continued)

*Primary Examiner* — Ross N Gushi
(74) *Attorney, Agent, or Firm* — Barley Snyder

(57) ABSTRACT

A connector includes a housing having a mounting port, a connection assembly installed in the mounting port of the housing and adapted to fasten a terminal of the connector to a mating terminal of a mating connector, the connection assembly has a first operation part exposed from the housing and the connection assembly is capable of being fastened or loosened by operating the first operation part, and a safety cover slidably mounted on the housing. The first operation part is in a position of interference with the safety cover to prevent the safety cover from being moved to a safety position when the connection assembly is not fastened.

21 Claims, 21 Drawing Sheets

(56) References Cited

U.S. PATENT DOCUMENTS

| | | | | |
|---|---|---|---|---|
| 11,942,729 | B2 * | 3/2024 | Yamada | H01R 13/533 |
| 11,955,751 | B2 * | 4/2024 | Nishijima | H01R 13/6592 |
| 12,046,858 | B2 * | 7/2024 | Martin | H01R 13/641 |
| 12,244,096 | B2 * | 3/2025 | Martin | H01R 13/6271 |
| 2014/0120763 | A1 * | 5/2014 | Itsuki | H01R 13/533<br>439/382 |
| 2017/0256893 | A1 * | 9/2017 | Kato | H01R 13/6593 |
| 2023/0123353 | A1 * | 4/2023 | Qian | H01R 13/641<br>439/490 |
| 2023/0187878 | A1 * | 6/2023 | Qian | H01R 13/701<br>439/489 |
| 2023/0291150 | A1 * | 9/2023 | Yang | H01R 13/701 |
| 2024/0063574 | A1 * | 2/2024 | Simbürger | H01R 13/6273 |
| 2024/0106175 | A1 * | 3/2024 | Li | H01R 13/6585 |
| 2024/0266777 | A1 * | 8/2024 | Matsuoka | H01R 13/504 |
| 2024/0317083 | A1 * | 9/2024 | Yamaguchi | H01R 13/04 |
| 2024/0413577 | A1 * | 12/2024 | Wimmer | H01R 13/465 |
| 2025/0023293 | A1 * | 1/2025 | Guillanton | H01R 13/748 |
| 2025/0030192 | A1 * | 1/2025 | Fang | H01R 13/665 |

* cited by examiner

CONNECTOR AND CONNECTOR ASSEMBLY

CROSS-REFERENCE TO RELATED APPLICATION

This application claims the benefit of the filing date under 35 U.S.C. § 119 (a)-(d) of Chinese Patent Application No. 202210225027.5, filed on Mar. 9, 2022, and Chinese Patent Application No. 202220496338.0, filed on Mar. 9, 2022.

FIELD OF THE INVENTION

The present invention relates to a connector and a connector assembly including the connector.

BACKGROUND

In the prior art, the connector at the cable end usually includes a housing, a terminal, a connection assembly and a cable. The terminal is arranged in the housing, and the cable extends into the housing and is electrically connected with the terminal. The connection assembly is installed in the housing, which is used to fasten the terminal to a mating terminal of a mating connector, so that the terminal is electrically connected with the mating terminal.

In the prior art, when the connector is mated with the mating connector, there is a lack of safety protection device to judge whether the connection assembly has been fastened to prevent the fastened connection assembly from being accidentally loosened, which reduces the use safety of the connector.

In addition, in the prior art, in order to detect the connection state between the terminal of the connector and the mating terminal of the mating connector, it is also necessary to set a high-voltage interlock (or called a detection connector) and a mating high-voltage interlock (or called a mating detection connector) on the connector and the mating connector respectively. However, the existing high-voltage interlock is fixed on the housing of the connector, so there is a risk that the high-voltage interlock will be mated with the mating high-voltage interlock before the terminal of the connector is electrically connected with the mating terminal of the mating connector, which also reduces the use safety of the connector.

SUMMARY

A connector includes a housing having a mounting port, a connection assembly installed in the mounting port of the housing and adapted to fasten a terminal of the connector to a mating terminal of a mating connector, the connection assembly has a first operation part exposed from the housing and the connection assembly is capable of being fastened or loosened by operating the first operation part, and a safety cover slidably mounted on the housing. The first operation part is in a position of interference with the safety cover to prevent the safety cover from being moved to a safety position when the connection assembly is not fastened.

BRIEF DESCRIPTION OF THE DRAWINGS

Features of the present invention will become more apparent by describing in detail exemplary embodiments thereof with reference to the accompanying drawings, in which.

DETAILED DESCRIPTION OF THE EMBODIMENTS

Figure 1:
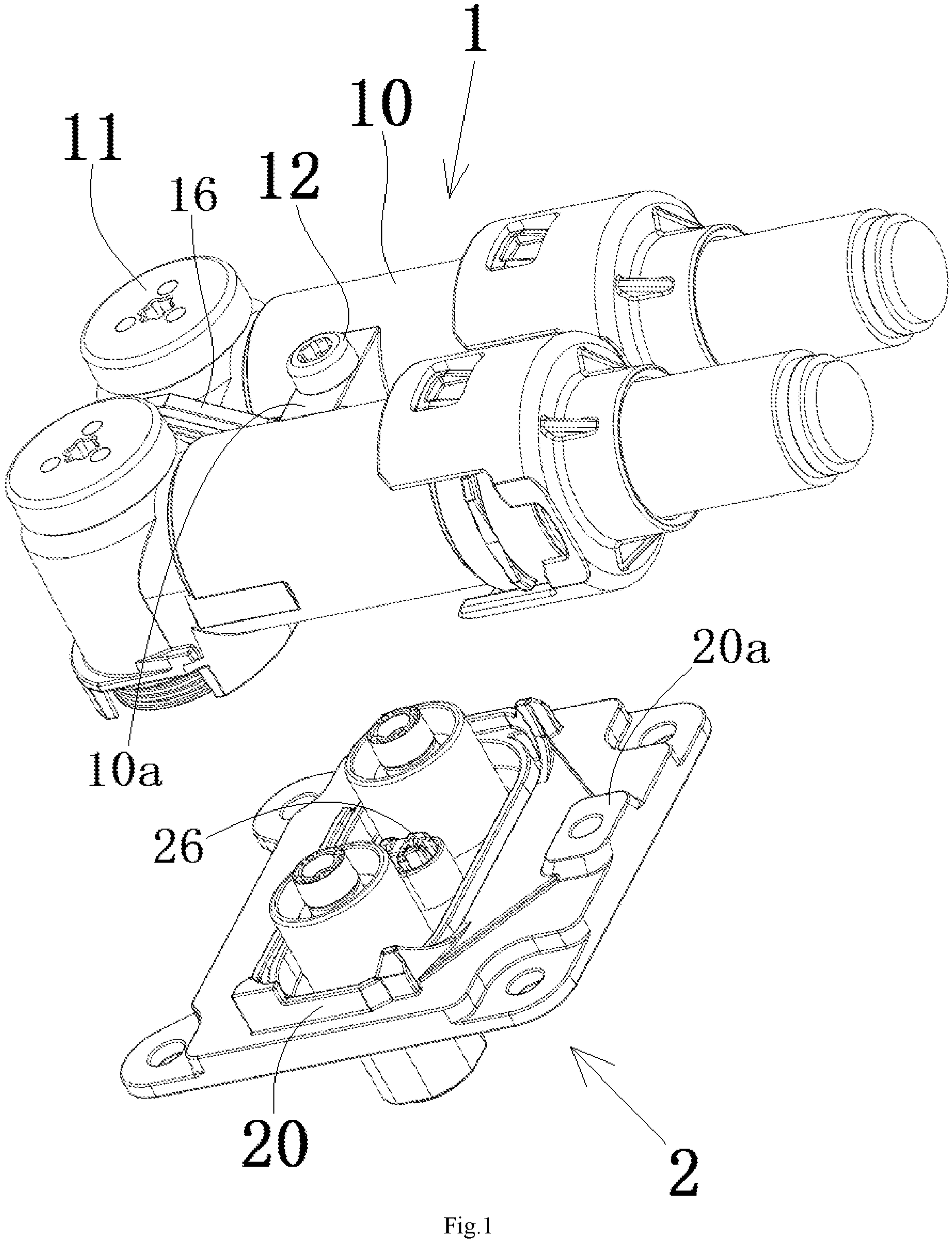
FIG. 1 shows an illustrative exploded view of a connector assembly according to an exemplary embodiment of the present invention, in which the safety cover of the connector is not shown.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
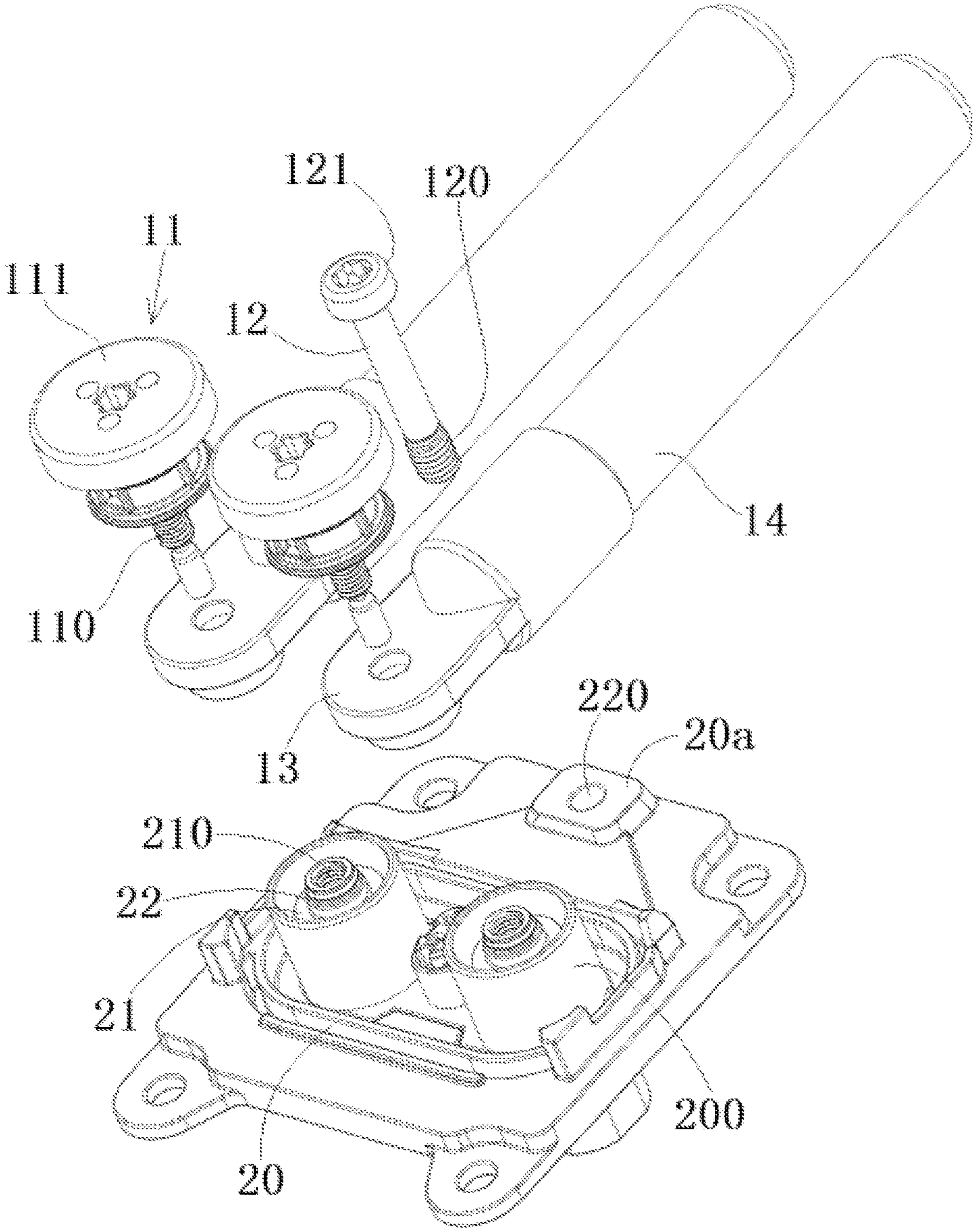
FIG. 2 shows an illustrative exploded view of the connector assembly according to an exemplary embodiment of the present invention, in which the safety cover and housing of the connector are not shown.
Figure 3:
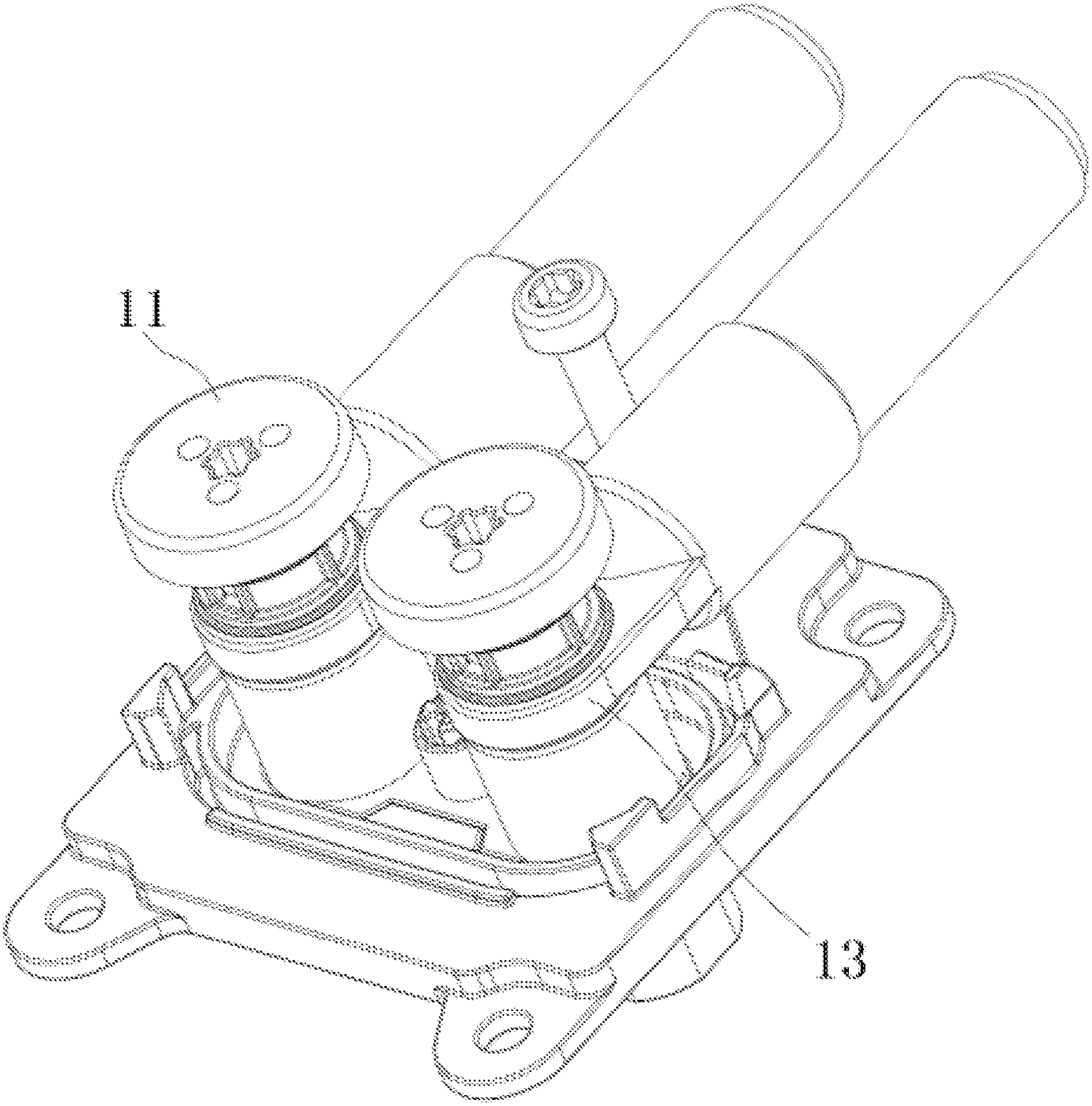
FIG. 3 shows an illustrative assembly view of the connector assembly according to an exemplary embodiment of the present invention, wherein the safety cover and housing of the connector are not shown.

As shown in FIGS. 1 to 3, in the illustrated embodiment, the connector assembly mainly includes a connector 1 and a mating connector 2. The connector 1 includes a housing 10, a terminal 13 and a connection assembly 11. The mating connector 2 includes a mating housing 20 mated with the housing 10 and a mating terminal 21 electrically connected with the terminal 13.

As shown in FIGS. 1 to 3, in the illustrated embodiment, terminal 13 is arranged in housing 10. The housing 10 has a mounting port 1011. The connection assembly 11 is installed in the mounting port 1011 of the housing 10, and is suitable for fastening the terminal 13 to the mating terminal 21 of the mating connector 2. The connection assembly 11 has a first operation part 111 exposed from the housing 10, which enables the connection assembly 11 to be fastened or loosened by the first operation part 111.

As shown in FIGS. 1 to 6, in the illustrated embodiment, the connector 1 also includes a safety cover 100, which is slidably mounted on the housing 10.

Figure 4:
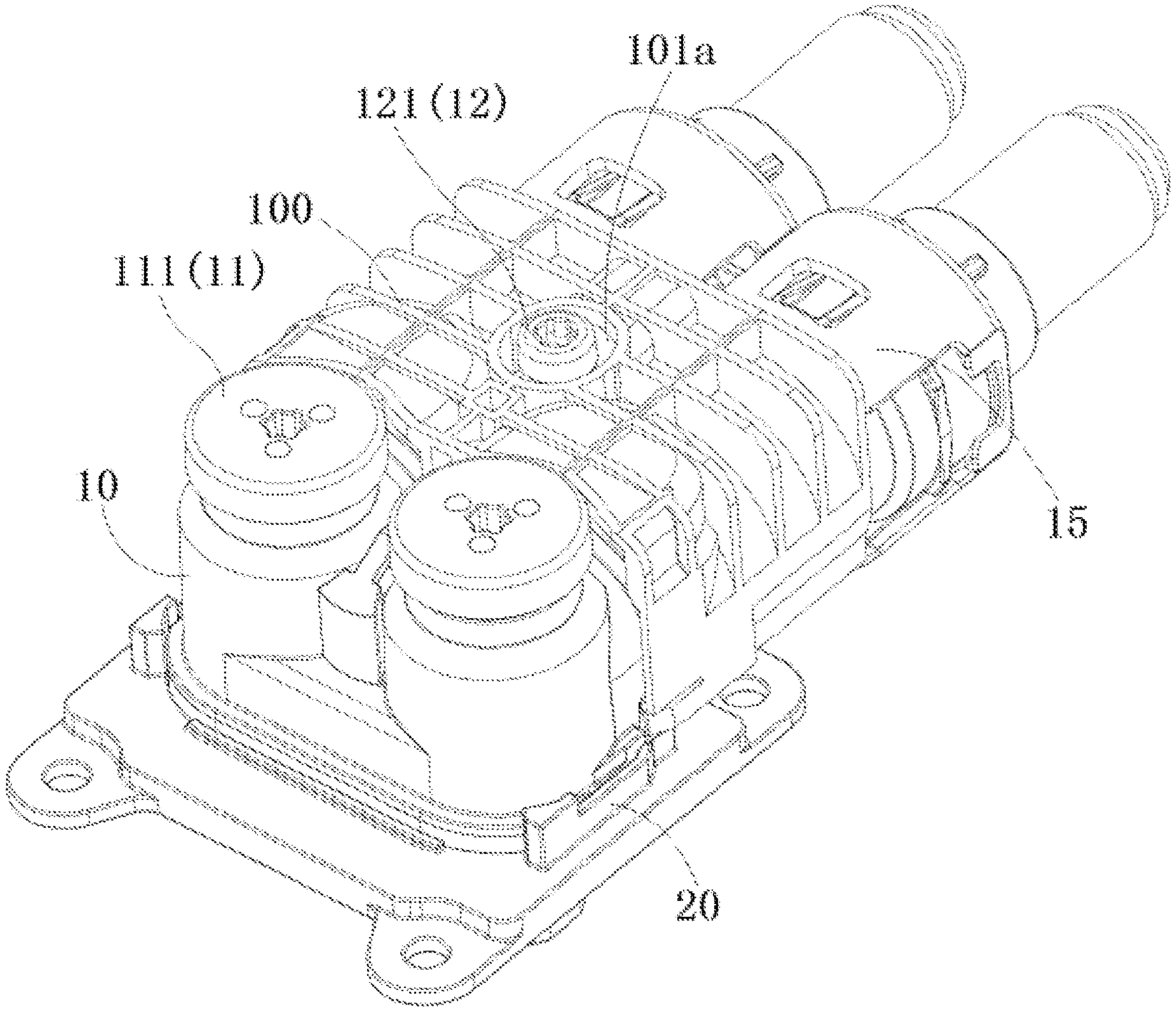
FIG. 4 shows an illustrative view of a connector assembly according to an exemplary embodiment of the present invention, wherein the connection assembly and the mechanical connection member are in the loosened position, and the safety cover is in the initial position.

As shown in FIG. 4, in the illustrated embodiment, when the connector 1 is mated with the mating connector 2, and when the connection assembly 11 is not fastened, the first operation part 111 is in the position of interference with the safety cover 100 (for example, as shown in FIG. 4, the top surface of the first operation part 111 is higher than the inner surface of the safety cover 100), to prevent the safety cover 100 from being moved from the initial position to the safe position.

Figure 5:
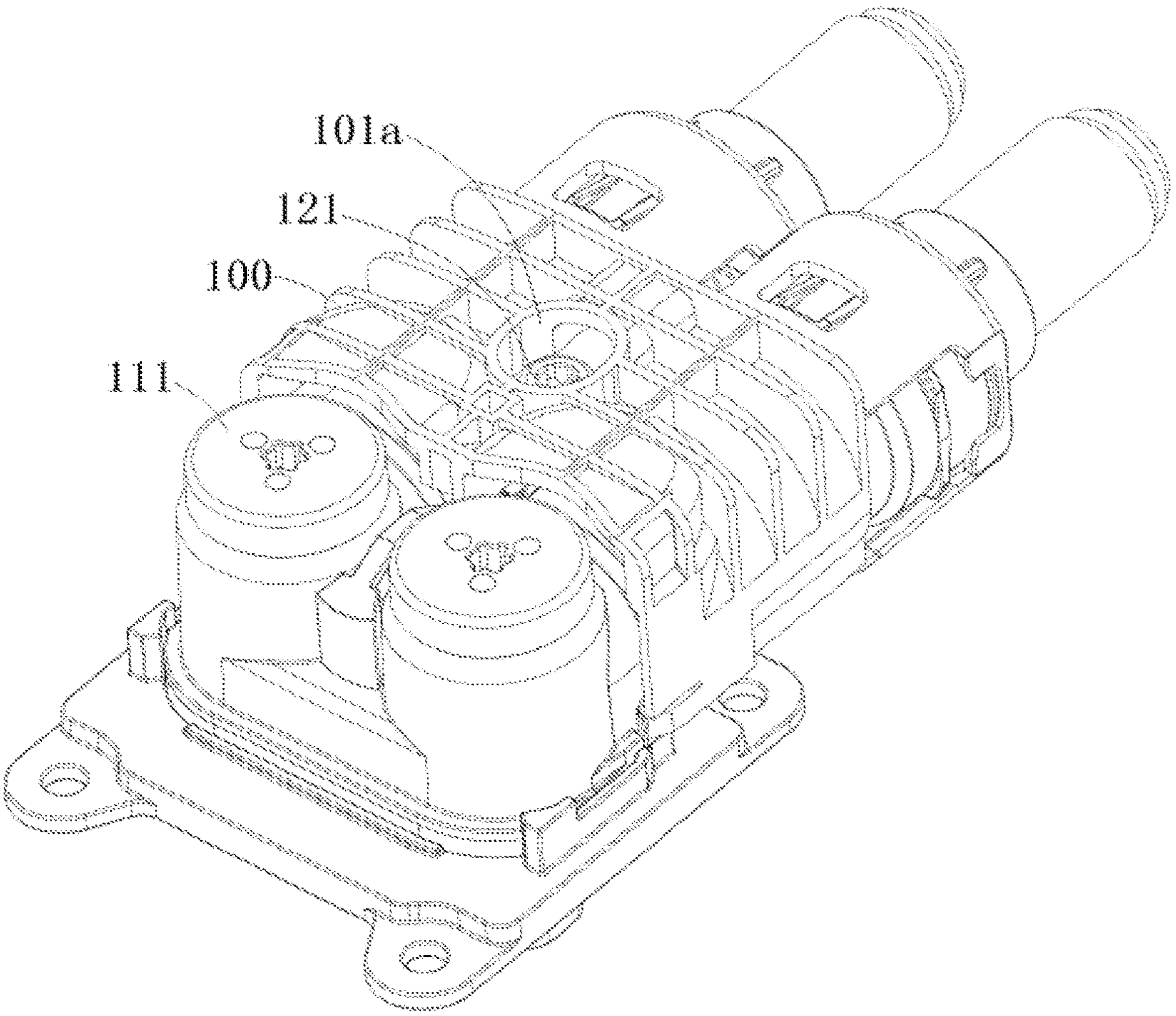
FIG. 5 shows an illustrative view of the connector assembly according to an exemplary embodiment of the present invention, wherein the connection assembly and the mechanical connection member are in the fastened position, and the safety cover is in the initial position.

As shown in FIGS. 4 and 5, in the illustrated embodiment, when the safety cover 100 is in the initial position, the first operation part 111 is not covered by the safety cover 100 to allow the connection assembly 11 to be fastened or loosened by operating the first operation part 111.

Please note that, as shown in FIGS. 4 and 5, in an exemplary embodiment of the present invention, when the safety cover 100 is in the initial position, the connection assembly 11 can be fastened (as shown in FIG. 5) or not be fastened (as shown in FIG. 4).

Figure 6:
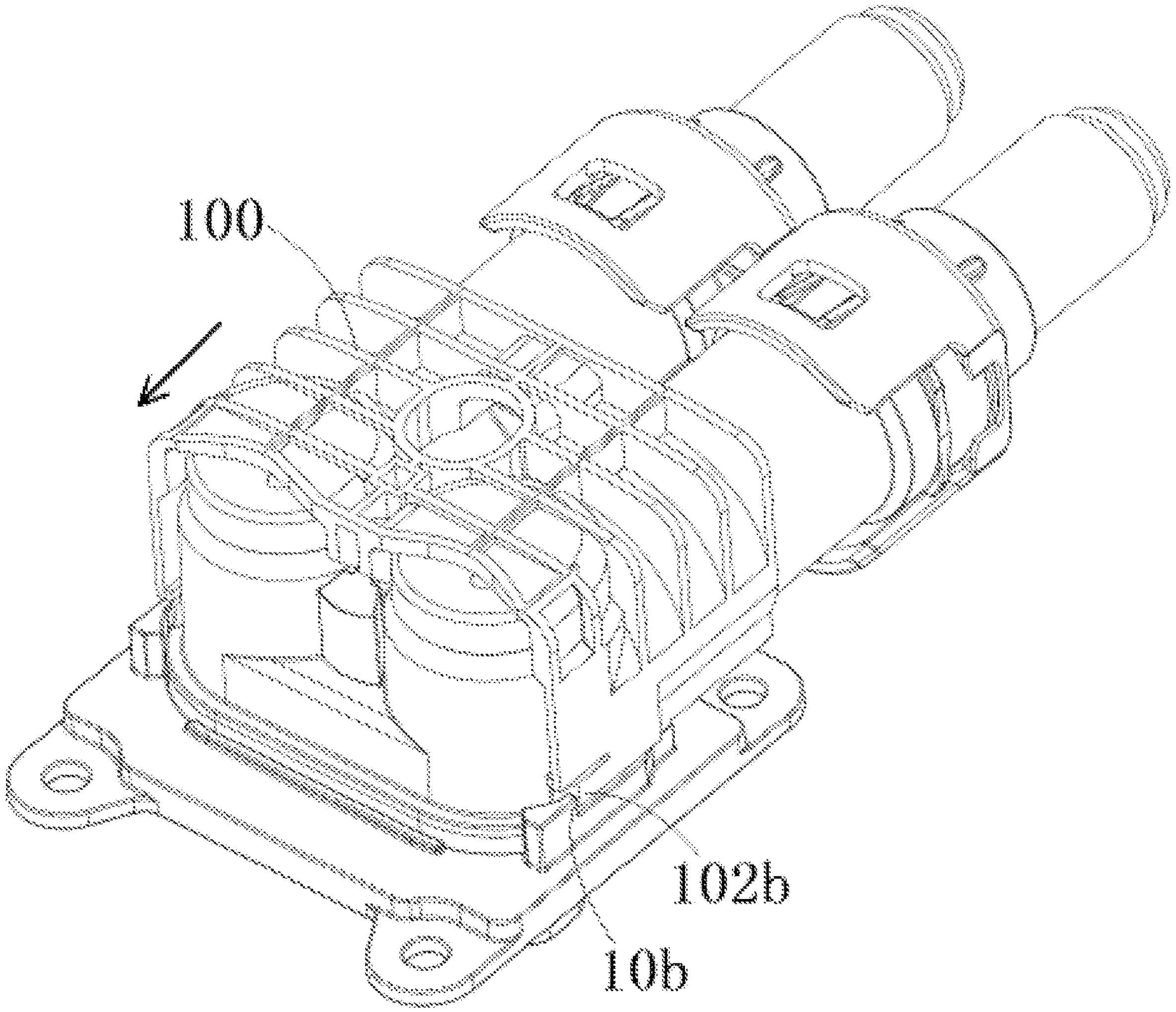
FIG. 6 shows an illustrative view of the connector assembly according to an exemplary embodiment of the present invention, wherein the connection assembly and the mechanical connection member are in the fastened position, and the safety cover is moved to the safe position.
Figure 7:
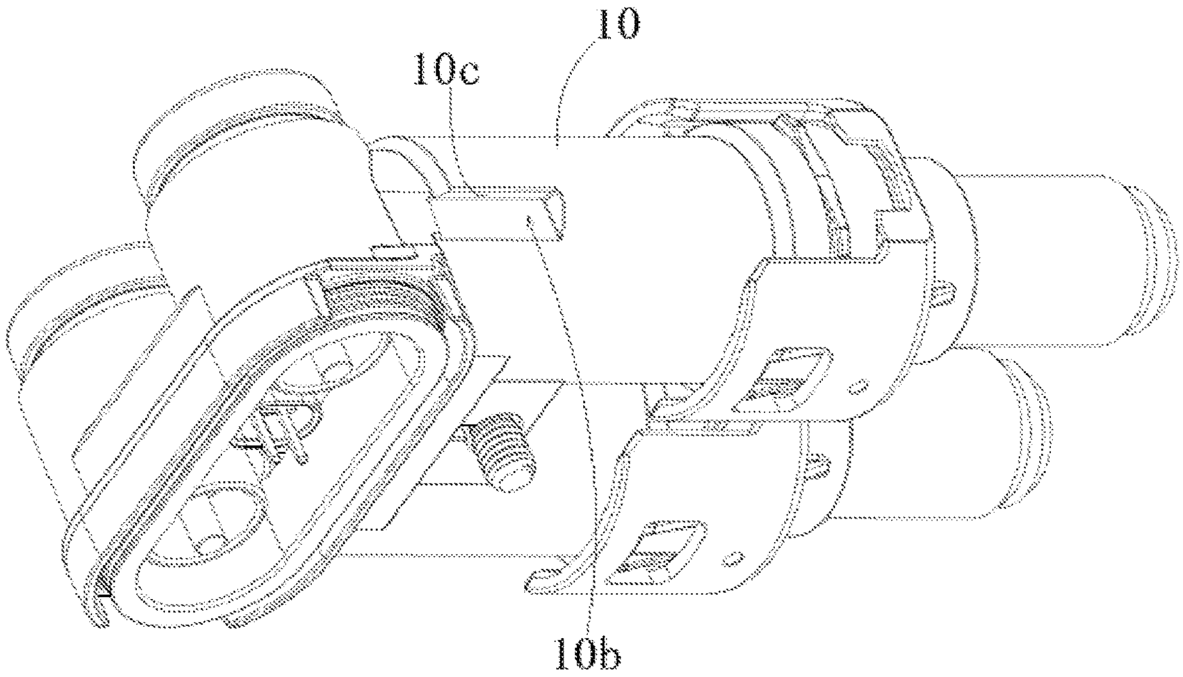
FIG. 7 shows an illustrative view of a connector housing according to an exemplary embodiment of the present invention.
Figure 8:
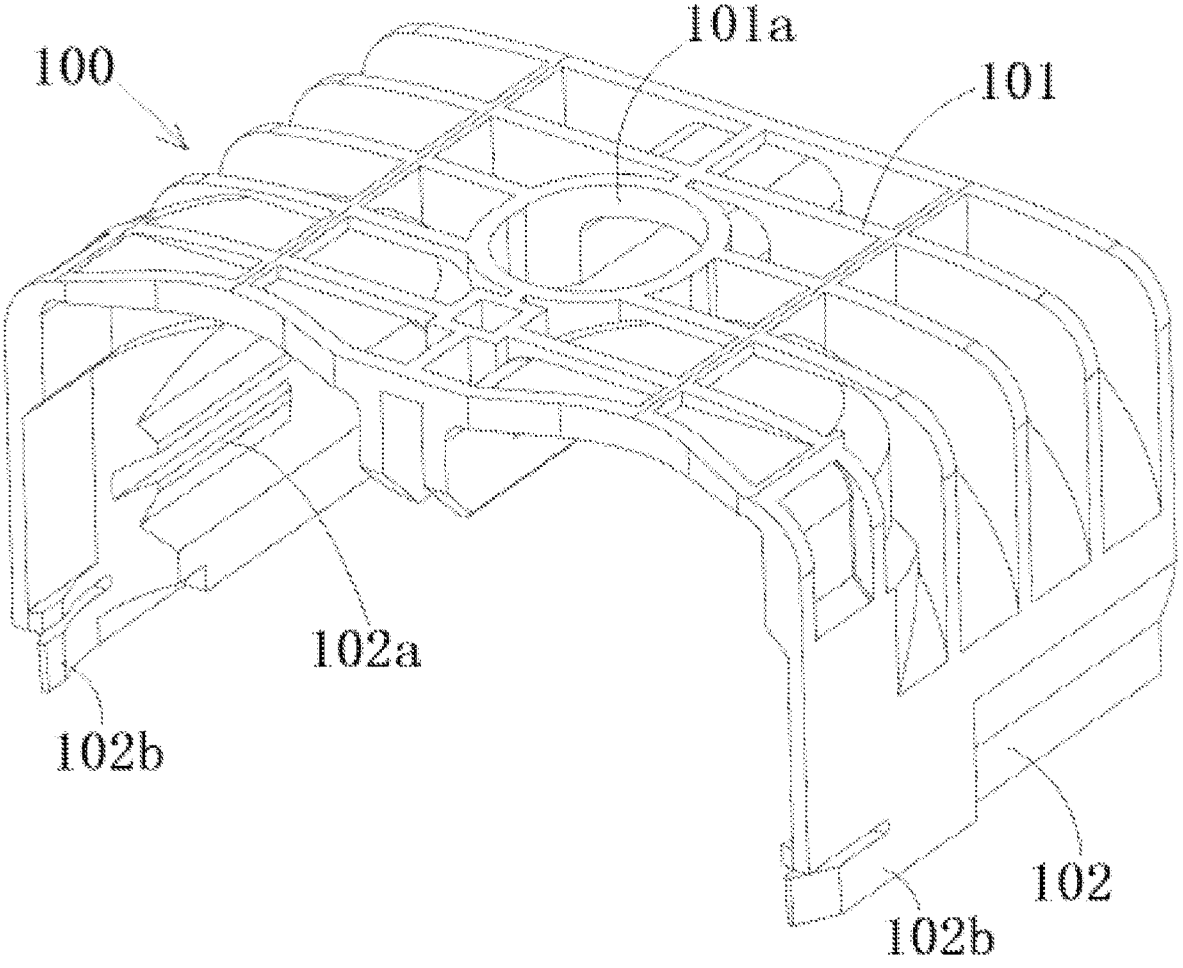
FIG. 8 shows an illustrative perspective view of the safety cover of the connector according to an exemplary embodiment of the present invention when viewed from the top.
Figure 9:
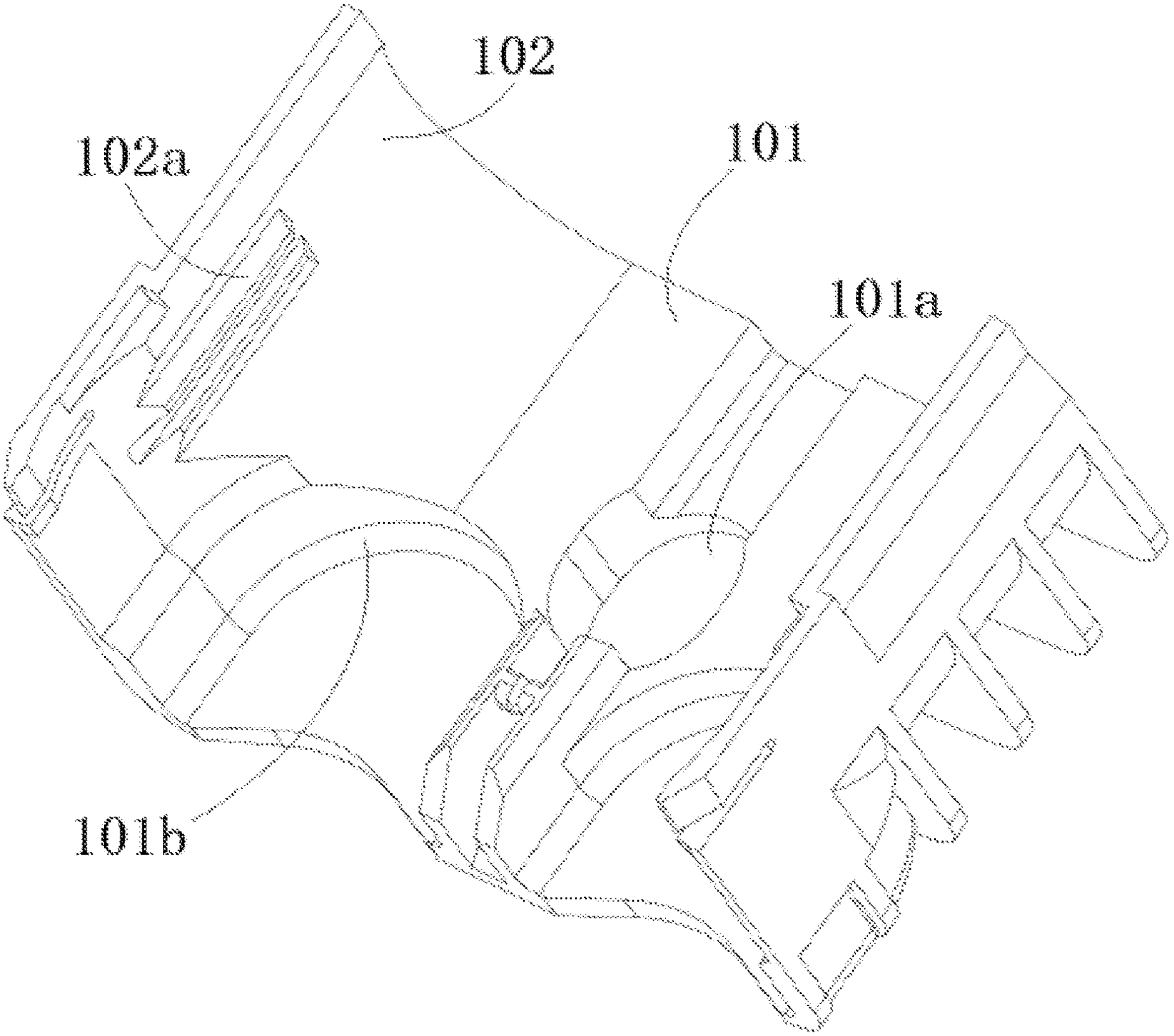
FIG. 9 shows an illustrative perspective view of the safety cover of the connector according to an exemplary embodiment of the present invention when viewed from the bottom.
Figure 10:
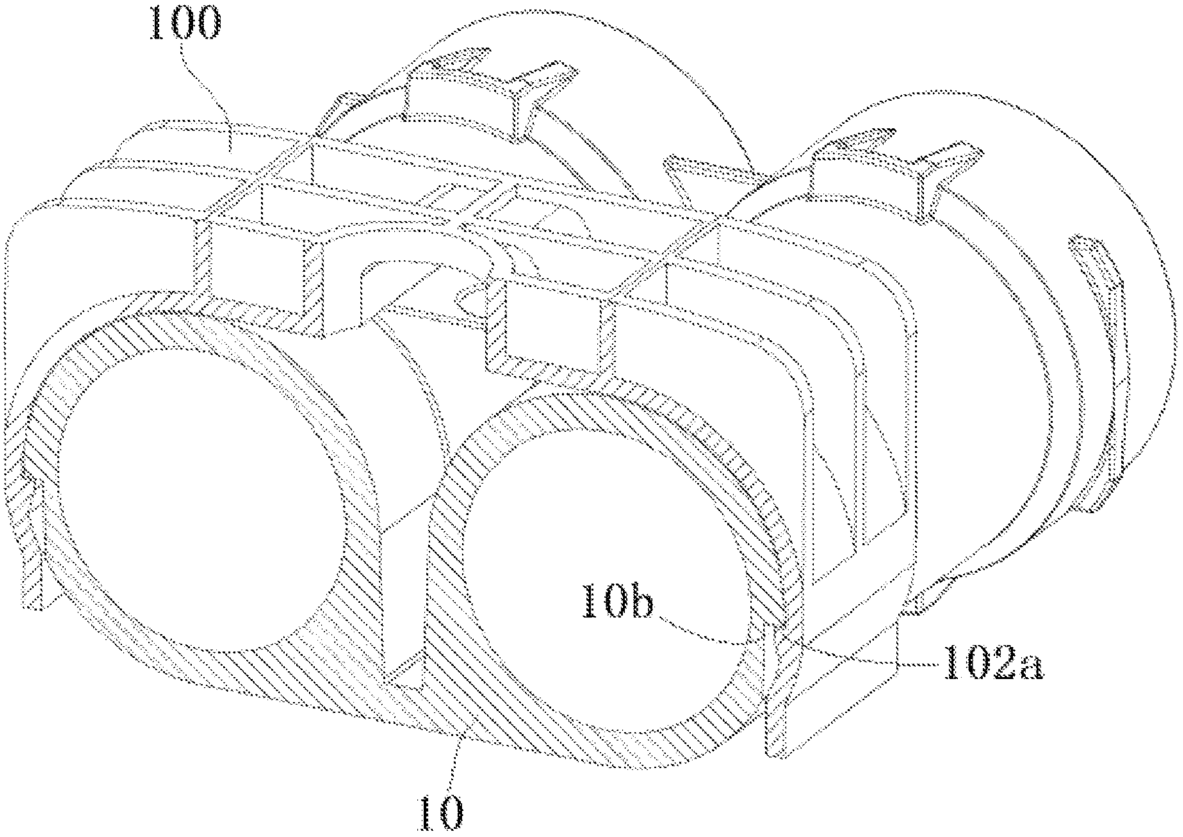
FIG. 10 shows a transverse sectional view of a connector housing and a safety cover according to an exemplary embodiment of the present invention.

As shown in FIG. 6, in the illustrated embodiment, when the safety cover 100 is in the safe position, the first operation part 111 is covered by the safety cover 100 to prevent the fastened connection assembly 11 from being loosened by operating the first operation part 111.

As shown in FIGS. 1 to 6, in the illustrated embodiment, the connector 1 also includes a mechanical connection member 12, which is installed on the housing 10 and is suitable for threaded connection with the mating housing 20 of the mating connector 2 to fasten the housing 10 onto the mating housing 20.

As shown in FIGS. 1 to 6, in the illustrated embodiment, the mechanical connection member 12 has a second operation part 121 exposed from the housing 10, so that the mechanical connection member 12 is capable of being fastened or loosened by operating the second operation part 121.

As shown in FIG. 4, in the illustrated embodiment, when the connector 1 is mated with the mating connector 2, and when the mechanical connection member 12 is not fastened, the second operation part 121 is in the position of interference with the safety cover 100 (for example, as shown in FIG. 4, the top surface of the second operation part 121 is higher than the inner surface of the safety cover 100) to prevent the safety cover 100 from being moved from the initial position to the safe position.

As shown in FIG. 4 and FIG. 5, in the illustrated embodiment, when the safety cover 100 is in the initial position, the second operation part 121 is not covered by the safety cover 100 to allow the mechanical connection member 12 to be fastened or loosened by operating the second operation part 121.

Please note that, as shown in FIGS. 4 and 5, in an exemplary embodiment of the present invention, when the safety cover 100 is in the initial position, the mechanical connection member 12 can be fastened (as shown in FIG. 5) or not be fastened (as shown in FIG. 4).

As shown in FIG. 6, in the illustrated embodiment, when the safety cover 100 is in the safe position, the second operation part 121 is covered by the safety cover 100 to prevent the mechanical connection member 12 from being loosened by operating the second operation part 121.

As shown in FIG. 4, in the illustrated embodiment, when the connector 1 is mated with the mating connector 2, and when either of the connection assembly 11 and the mechanical connection member 12 is not fastened, one of the first operation part 111 and the second operation part 121 will be in the position of interference with the safety cover 100, so that the safety cover 100 cannot be moved from the initial position to the safe position.

As shown in FIG. 5 and FIG. 6, in the illustrated embodiment, when the connector 1 is mated with the mating connector 2, and when the connection assembly 11 and the mechanical connection member 12 are fastened, the first operation part 111 and the second operation part 121 are in a position that does not interfere with the safety cover 100. At this time, the safety cover 100 can be moved from the initial position to the safe position.

As shown in FIGS. 1 to 10, in the illustrated embodiment, the safety cover 100 comprises a top wall 101 and a pair of side walls 102. An operation hole 101*a* is formed on the top wall 101. A pair of side walls 102 are respectively connected to the top wall 101. When the safety cover 100 is in the initial position, the first operation part 111 is located outside the safety cover 100, and the second operation part 121 is exposed from the safety cover 100 through the operation hole 101*a*.

As shown in FIGS. 1 to 10, in the illustrated embodiment, a guide slot 10*b* extending in a first direction is formed on one of the outer wall surface of the housing 10 and the inner wall surface of the side wall 102 of the safety cover 100, and a guide rib 102*a* extending in the first direction is formed on the other. The guide rib 102*a* is buckled into the guide slot 10*b* and can be moved along the guide slot 10*b* in the first direction to guide the safety cover 100 to move between the initial position and the safety position relative to the housing 10.

As shown in FIGS. 1 to 10, in the illustrated embodiment, the guide slot 10*b* is formed on the outer wall surface of the housing 10, and the guide rib 102*a* is formed on the inner wall surface of the side wall 102 of the safety cover 100. The guide slot 10*b* has a guide surface 10*c* extending in the first direction, and the guide rib 102*a* slides in contact with the guide surface 10*c* to guide the guide rib 102*a* to move in the first direction.

As shown in FIGS. 1 to 10, in the illustrated embodiment, a limit part 101*b* is formed on the inner wall surface of the top wall 101 of the safety cover 100. When the safety cover 100 is moved from the initial position to the safe position, the limit part 101*b* rests against the first operation part 111 to limit the safety cover 100 at the safe position.

As shown in FIGS. 1 to 10, in the illustrated embodiment, connector 1 also includes a cable 14 and an end cover 15. One end of the cable 14 is inserted into the housing 10 in the first direction and electrically connected with the terminal 13. The end cover 15 is sleeved on one end of the housing 10 to fix the cable 14 to the housing 10.

As shown in FIGS. 1 to 10, in the illustrated embodiment, a cable port 1014 allowing the cable 14 to be inserted in the first direction is formed on one end of the housing 10. The mounting port 1011 is formed on the top of the other end of the housing 10 to allow the connection assembly 11 to be inserted in the second direction perpendicular to the first direction. A mating port is formed at the bottom of the other end of the housing 10 to allow the connector 1 to mate with the mating connector 2 in the second direction.

As shown in FIGS. 1 to 10, in the illustrated embodiment, each of the safety cover 100 and the end cover 15 has a front end and a rear end which are opposite to each other in the first direction. When the safety cover 100 is moved from the safe position to the initial position, the front end face of the end cover 15 rests against the rear end face of the safety cover 100 to limit the safety cover 100 at the initial position.

As shown in FIGS. 1 to 10, in the illustrated embodiment, the housing 10 includes at least two housing units and a connection part 10*a*. The connection part 10*a* is connected between two adjacent housing units of the housing 10. A mounting hole is formed on the connection part 10*a*, and the mechanical connection member 12 is installed in the mounting hole of the connection part 10*a*.

As shown in FIGS. 1 to 10, in the illustrated embodiment, connector 1 includes at least two terminals 13, at least two connection assemblies 11, at least two cables 14 and at least two end covers 15. At least two terminals 13 are respectively arranged in at least two housing units for electrical connection with at least two mating terminals 21. At least two connection assemblies 11 are respectively installed in at least two housing units for fastening at least two terminals 13 to at least two mating terminals 21. At least two cables 14 are respectively inserted into at least two housing units and electrically connected with at least two terminals 13. At least two end covers 15 are respectively sleeved on one ends of at least two housing units for fixing at least two cables 14 to at least two housing units.

However, the present invention is not limited to the illustrated embodiment. For example, the connector 1 can include: one terminal 13, one connection assembly 11, one cable 14 and one end cover 15.

As shown in FIGS. 1 to 10, in the illustrated embodiment, the safety cover 100 is an integral molded part. For example, the safety cover 100 can be integrally molded.

Figure 11:
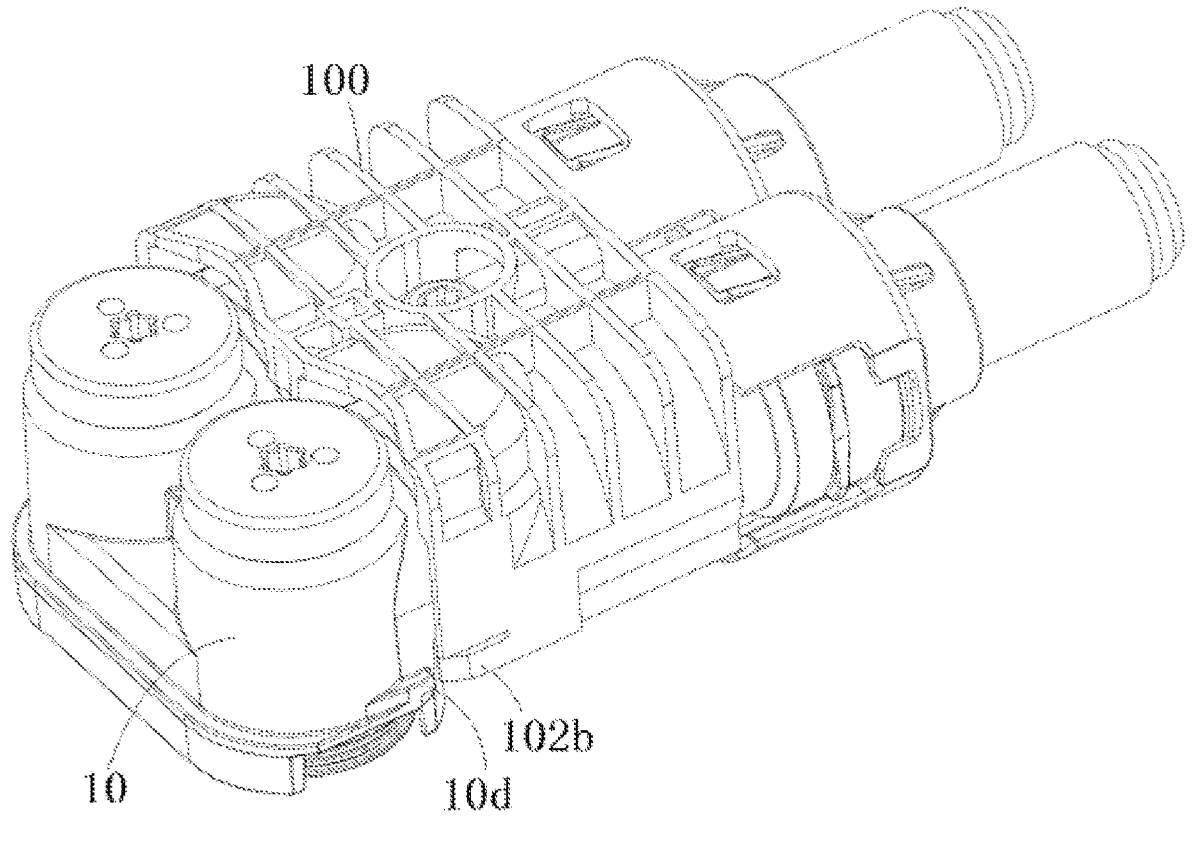
FIG. 11 shows an illustrative view of a connector according to an exemplary embodiment of the present invention, wherein the connection assembly and mechanical connection member are in the fastened position, and the safety cover is in the initial position.
Figure 12:
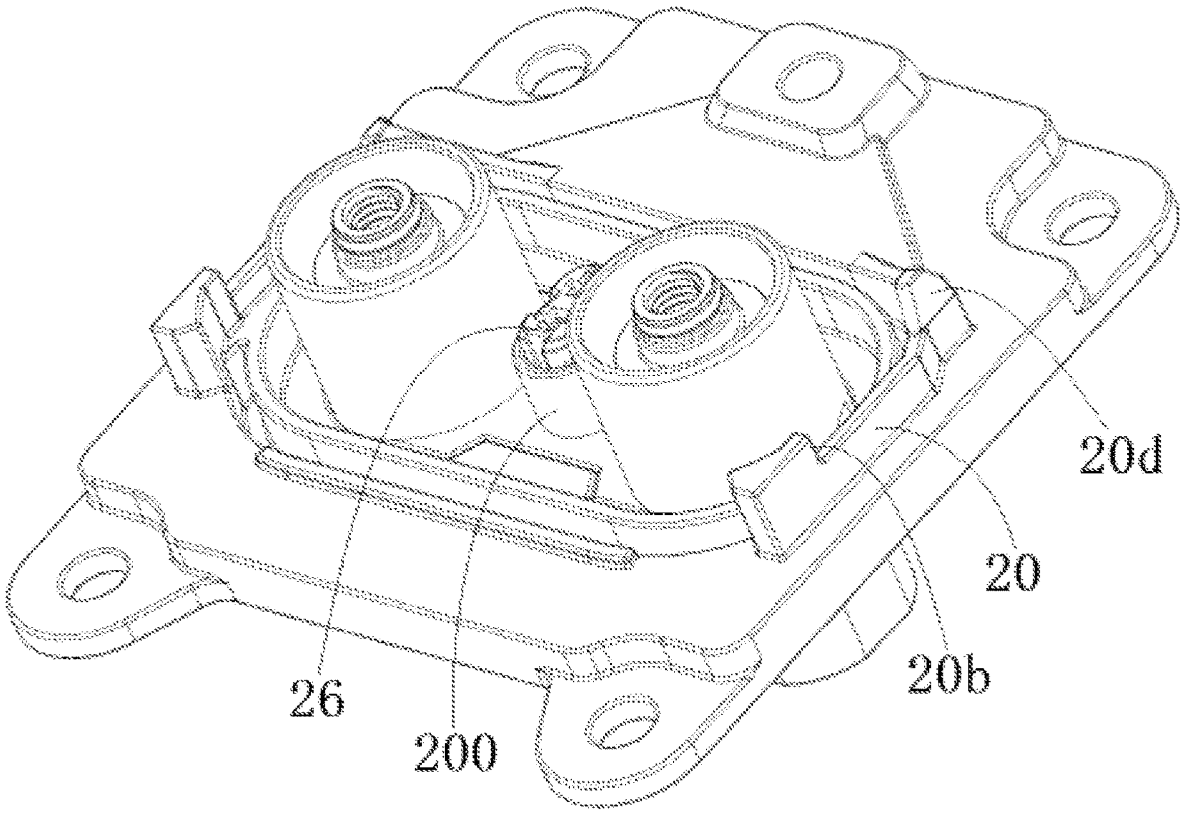
FIG. 12 shows an illustrative perspective view of a mating connector according to an exemplary embodiment of the present invention.
Figure 13:
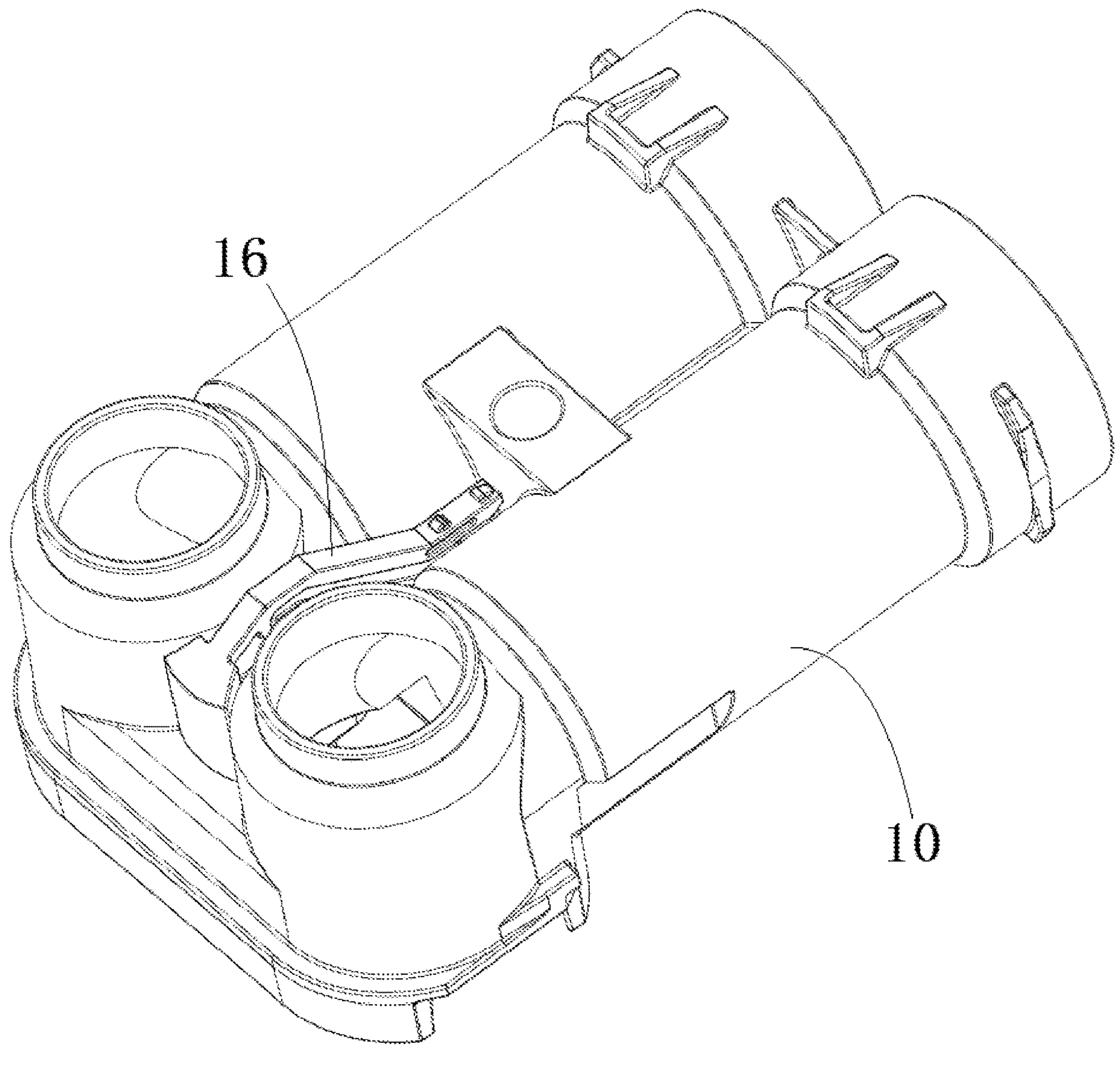
FIG. 13 shows an illustrative assembly view of the connector housing and the high-voltage interlock according to an exemplary embodiment of the present invention.
Figure 14:
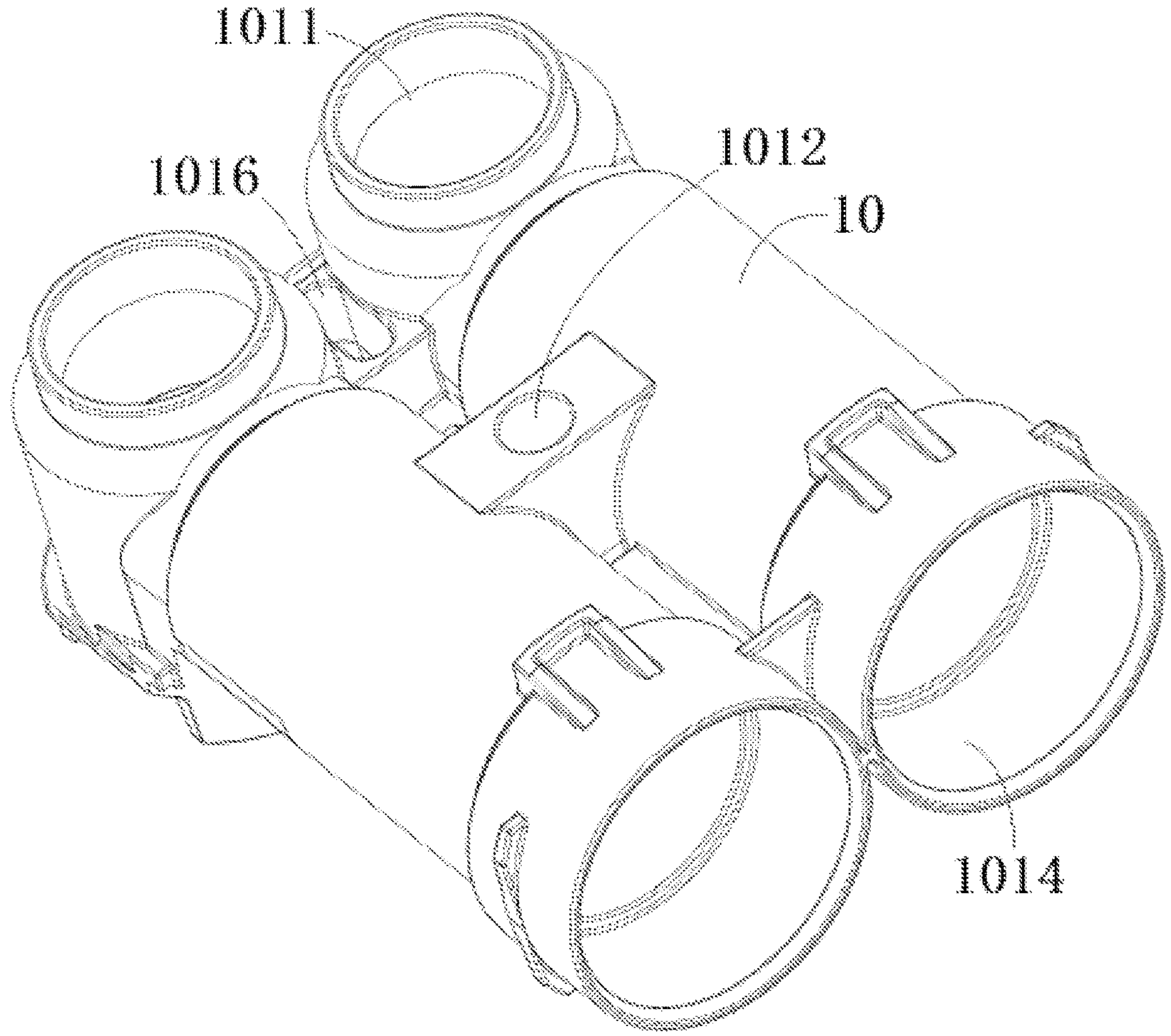
FIG. 14 shows an illustrative perspective view of a connector housing according to an exemplary embodiment of the present invention.
Figure 15:
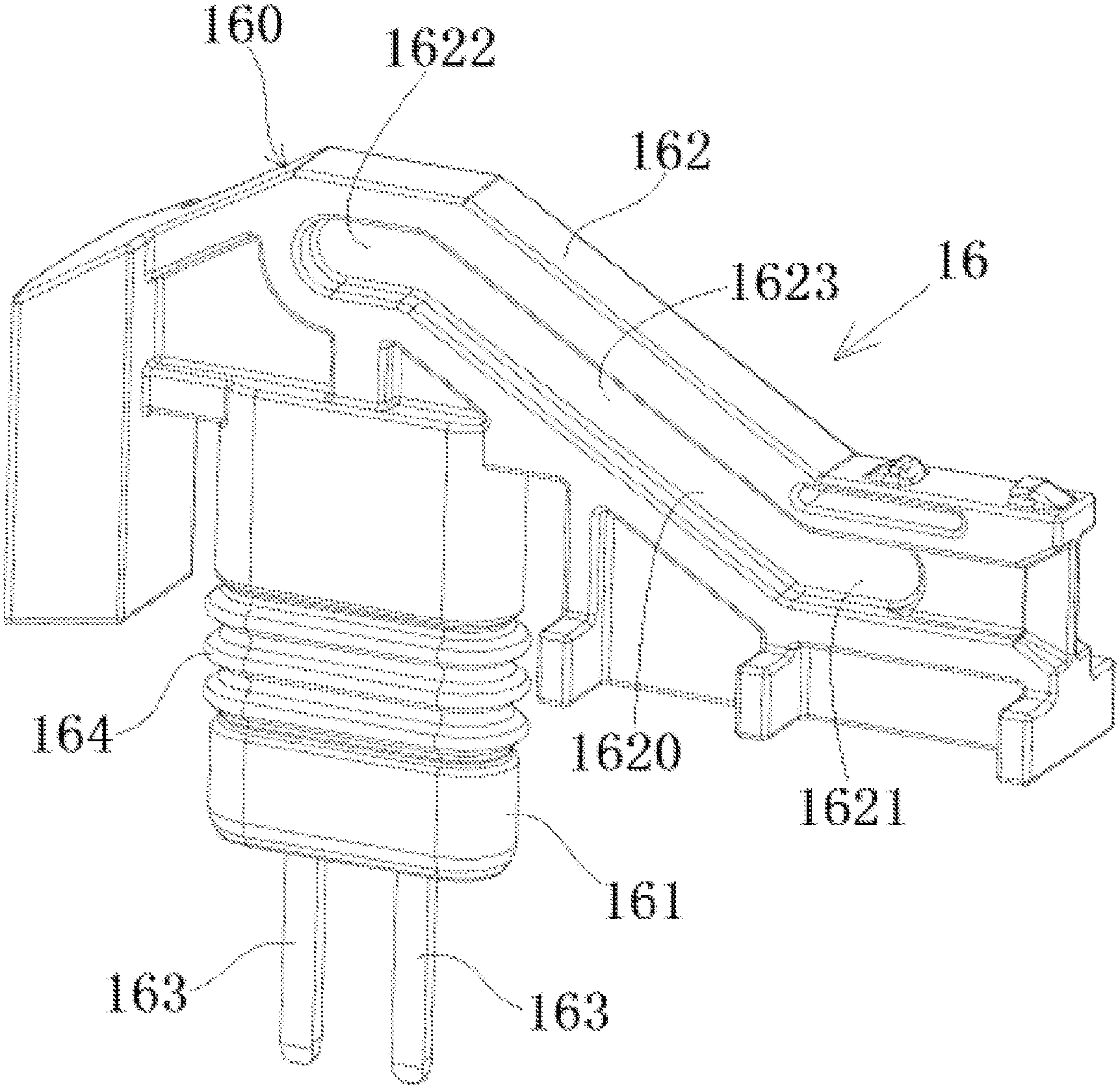
FIG. 15 shows an illustrative perspective view of a high-voltage interlock of a connector according to an exemplary embodiment of the present invention.
Figure 16:
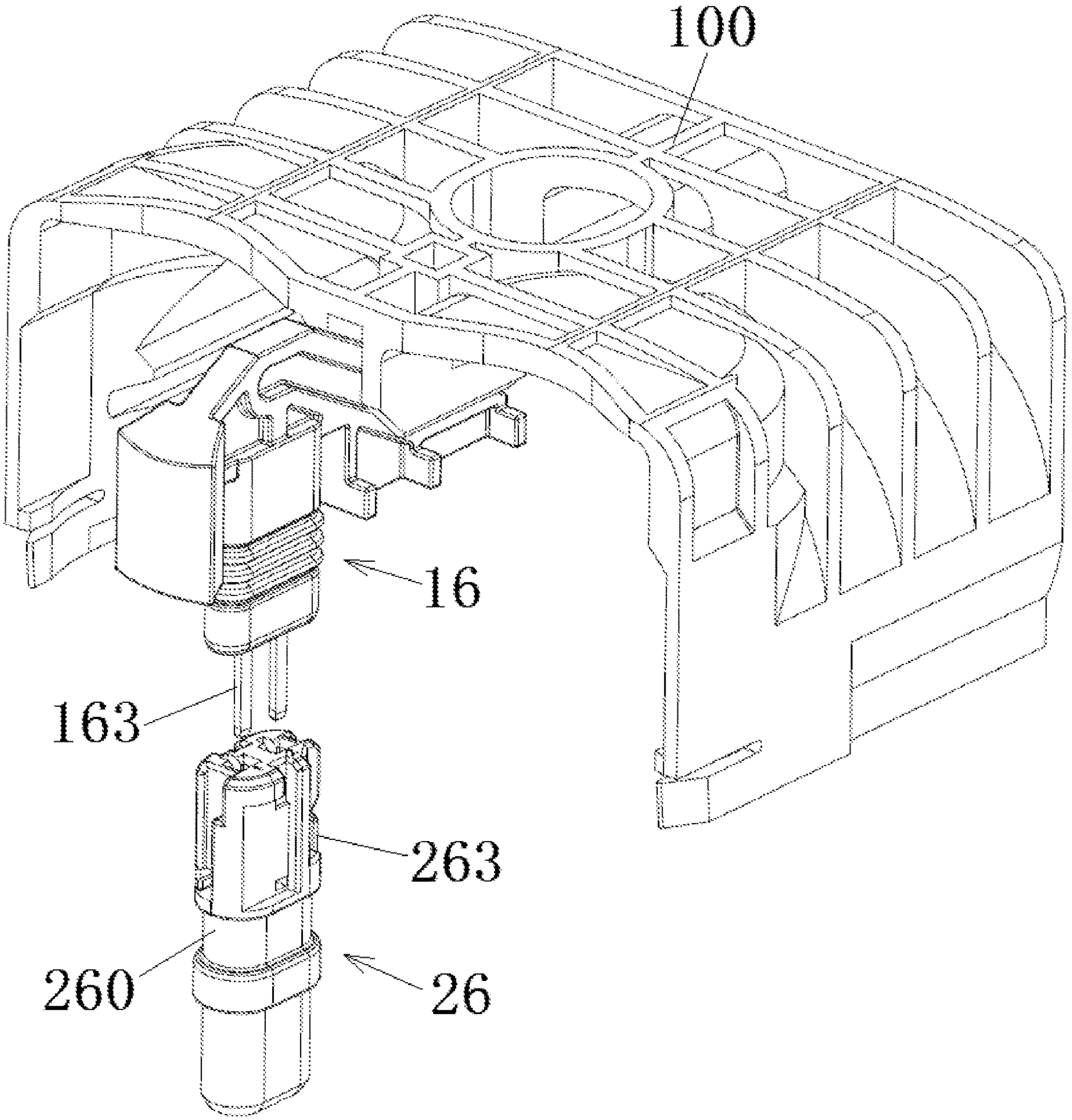
FIG. 16 shows an illustrative view of a high-voltage interlock and safety cover of a connector and a mating high-voltage interlock of a mating connector according to an exemplary embodiment of the present invention, wherein the safety cover is in the initial position and the high-voltage interlock is in the disconnected position.
Figure 17:
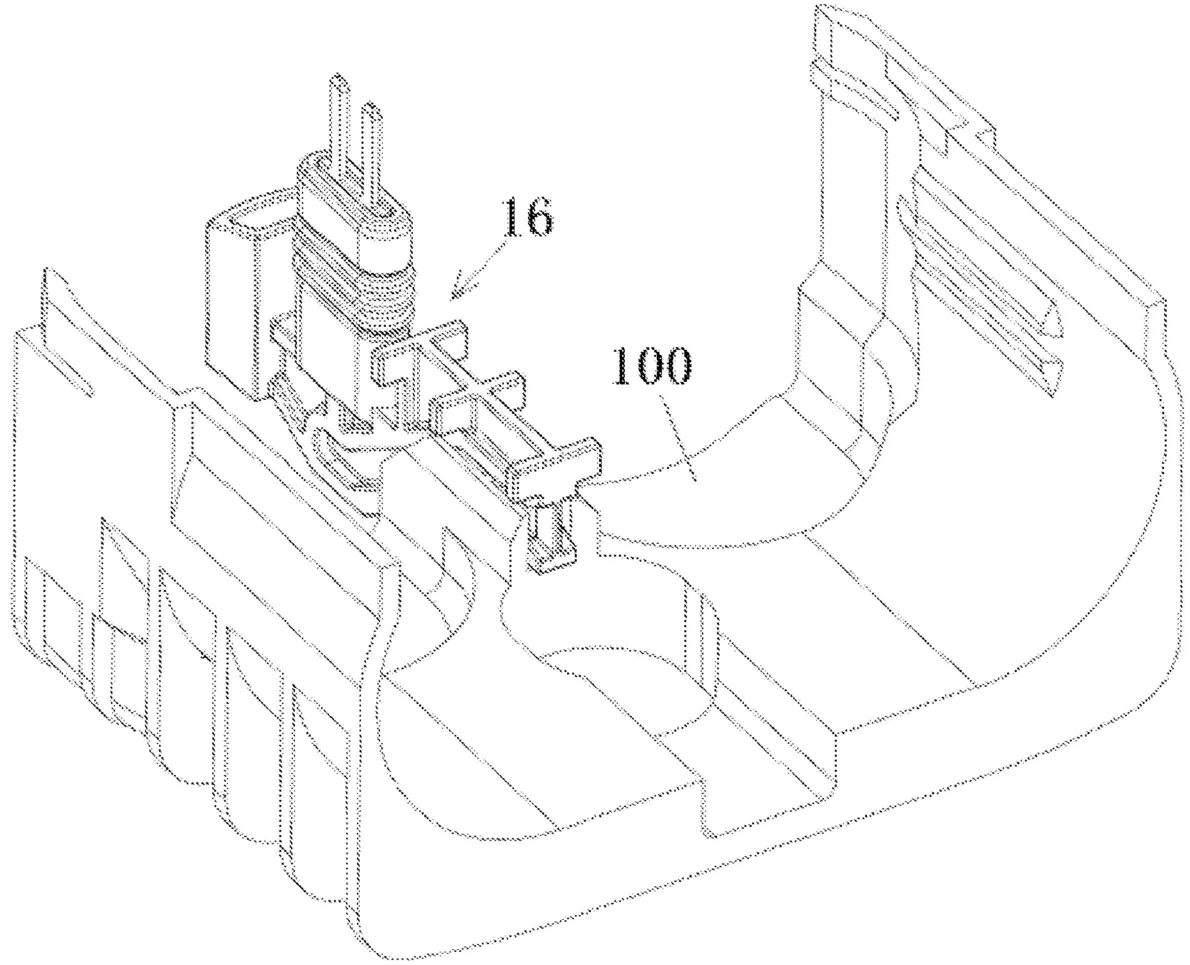
FIG. 17 shows an illustrative assembly view of the high-voltage interlock and the safety cover of the connector according to an exemplary embodiment of the present invention, wherein the safety cover is in the initial position.
Figure 18:
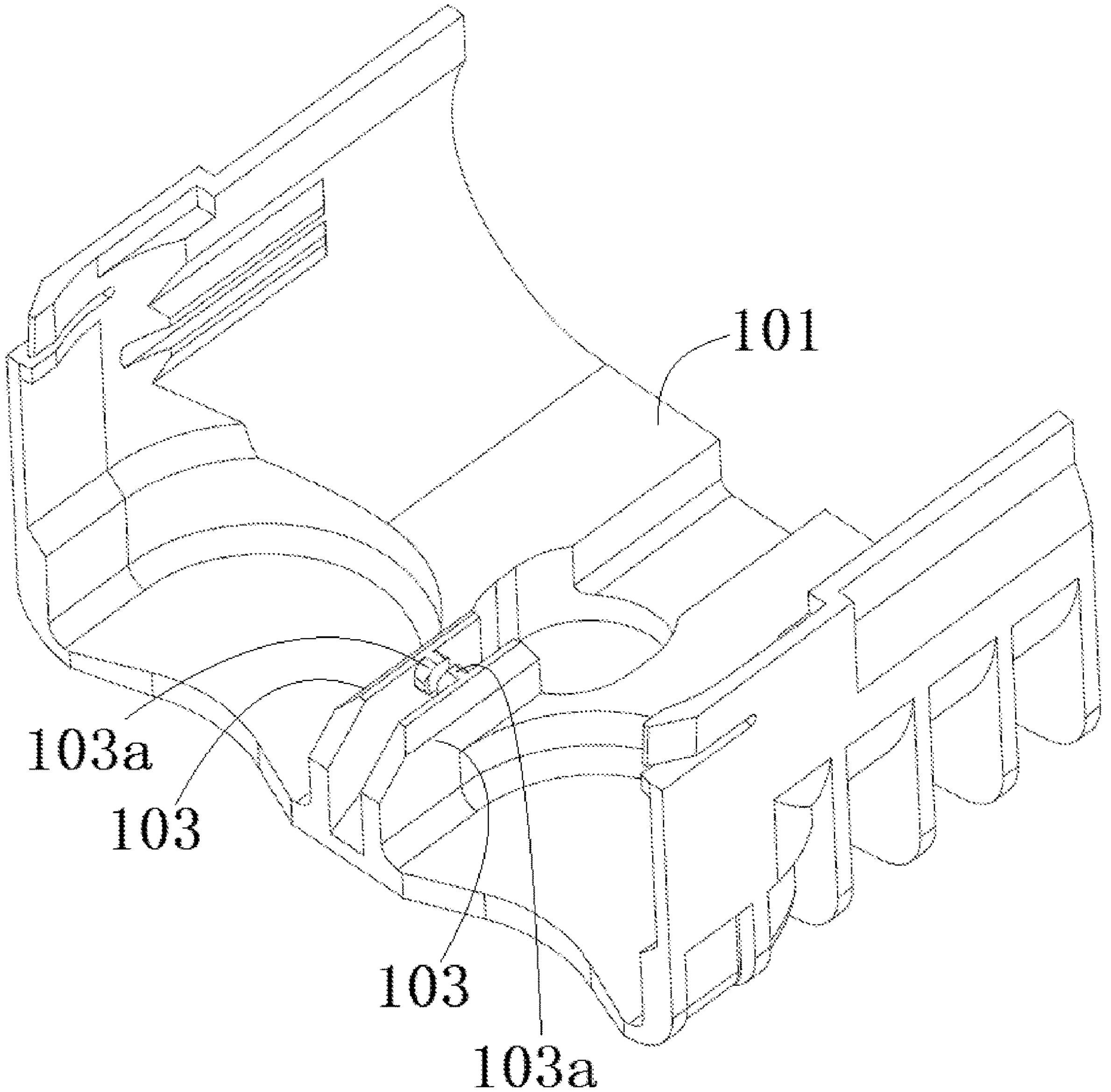
FIG. 18 shows an illustrative view of the safety cover of the connector according to an exemplary embodiment of the present invention when viewed from the bottom, in which the structure connected with the high-voltage interlock is shown.
Figure 19:
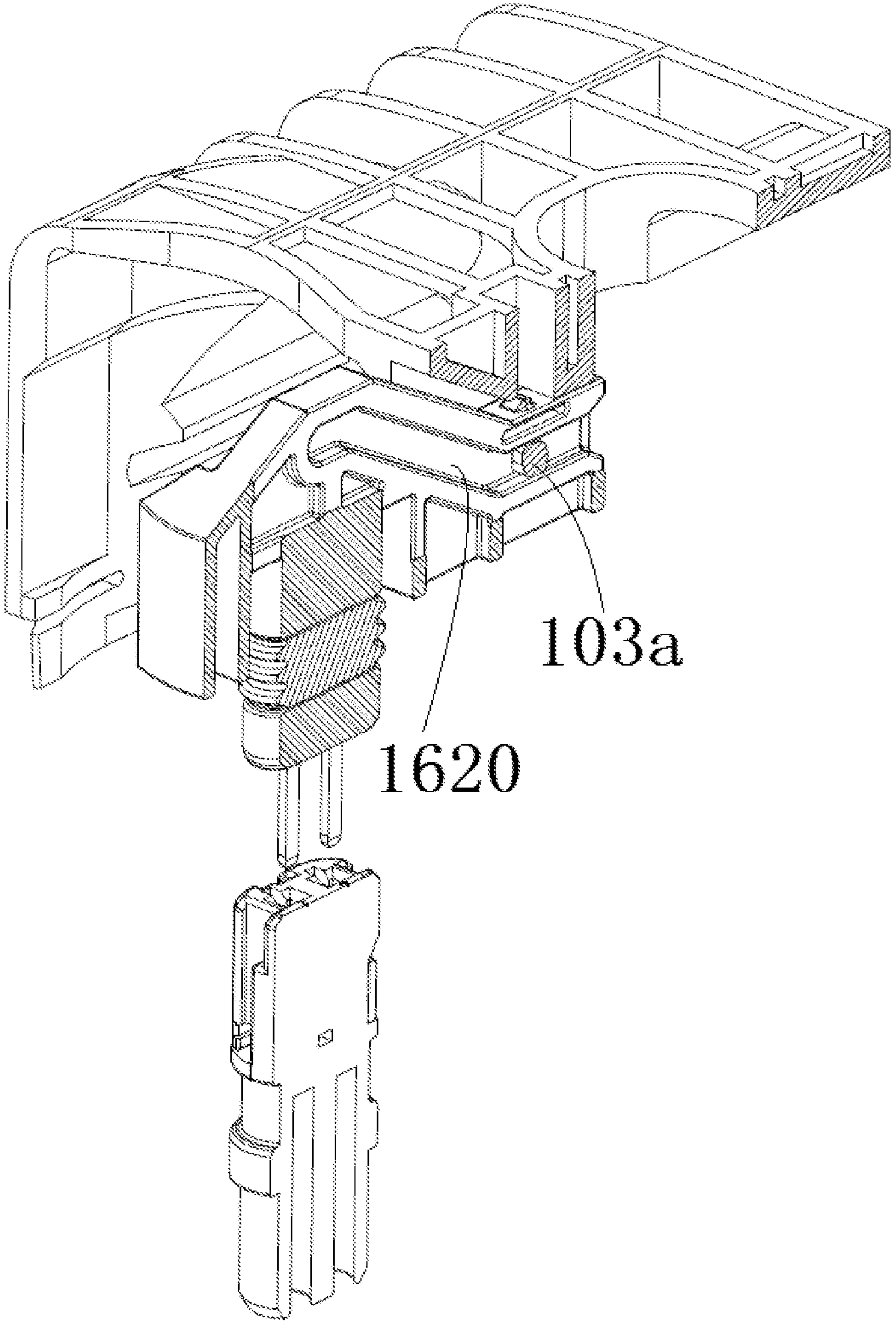
FIG. 19 shows the sectional view of the high-voltage interlock and safety cover of the connector and the mating high-voltage interlock of the mating connector according to an exemplary embodiment of the present invention, wherein the safety cover is in the safe position and the high-voltage interlock is in the connected position.
Figure 20:
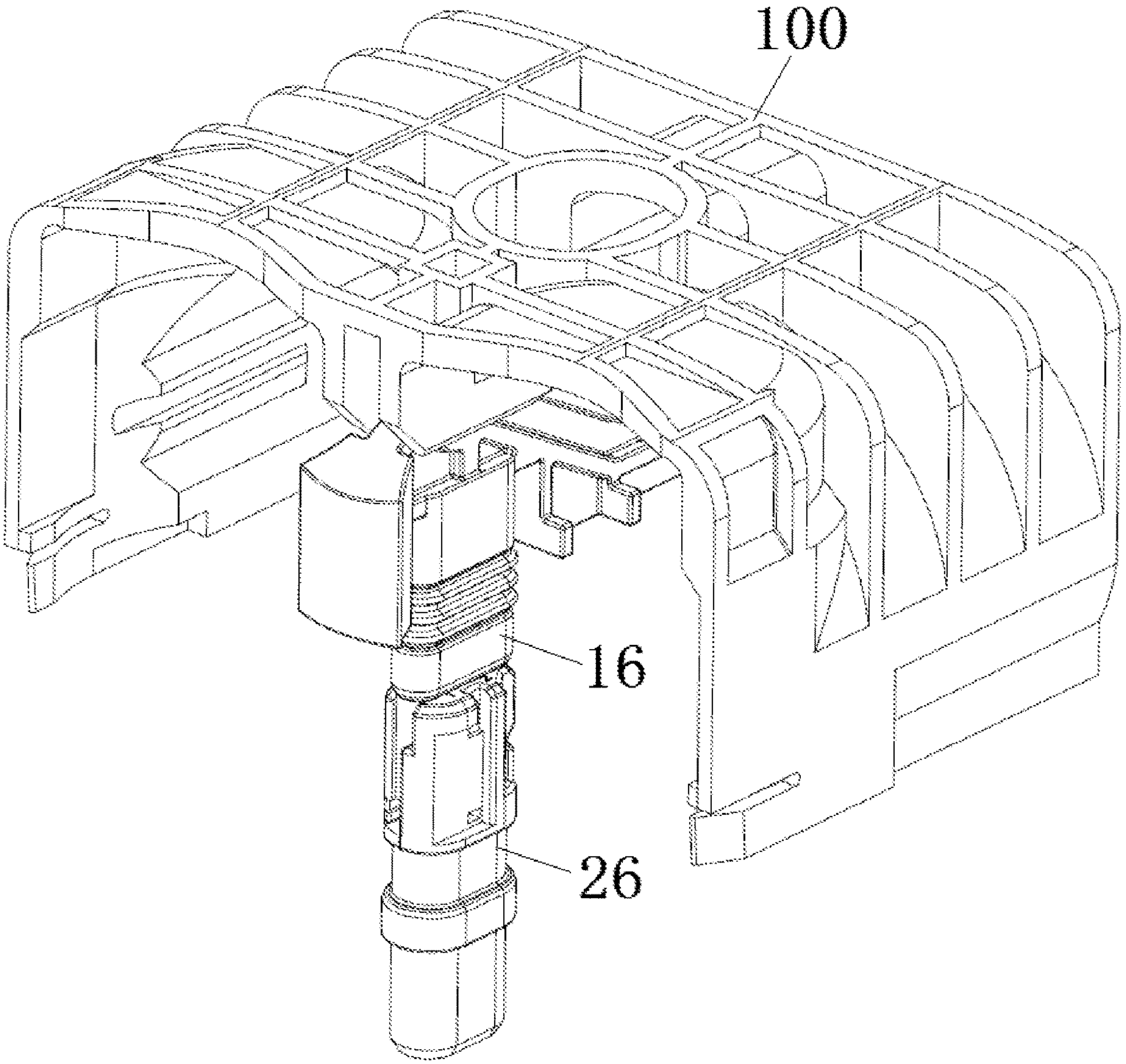
FIG. 20 shows an illustrative view of the high-voltage interlock and safety cover of the connector and the mating high-voltage interlock of the mating connector according to an exemplary embodiment of the present invention, wherein the safety cover is in the safe position and the high-voltage interlock is in the connected position.
Figure 21:
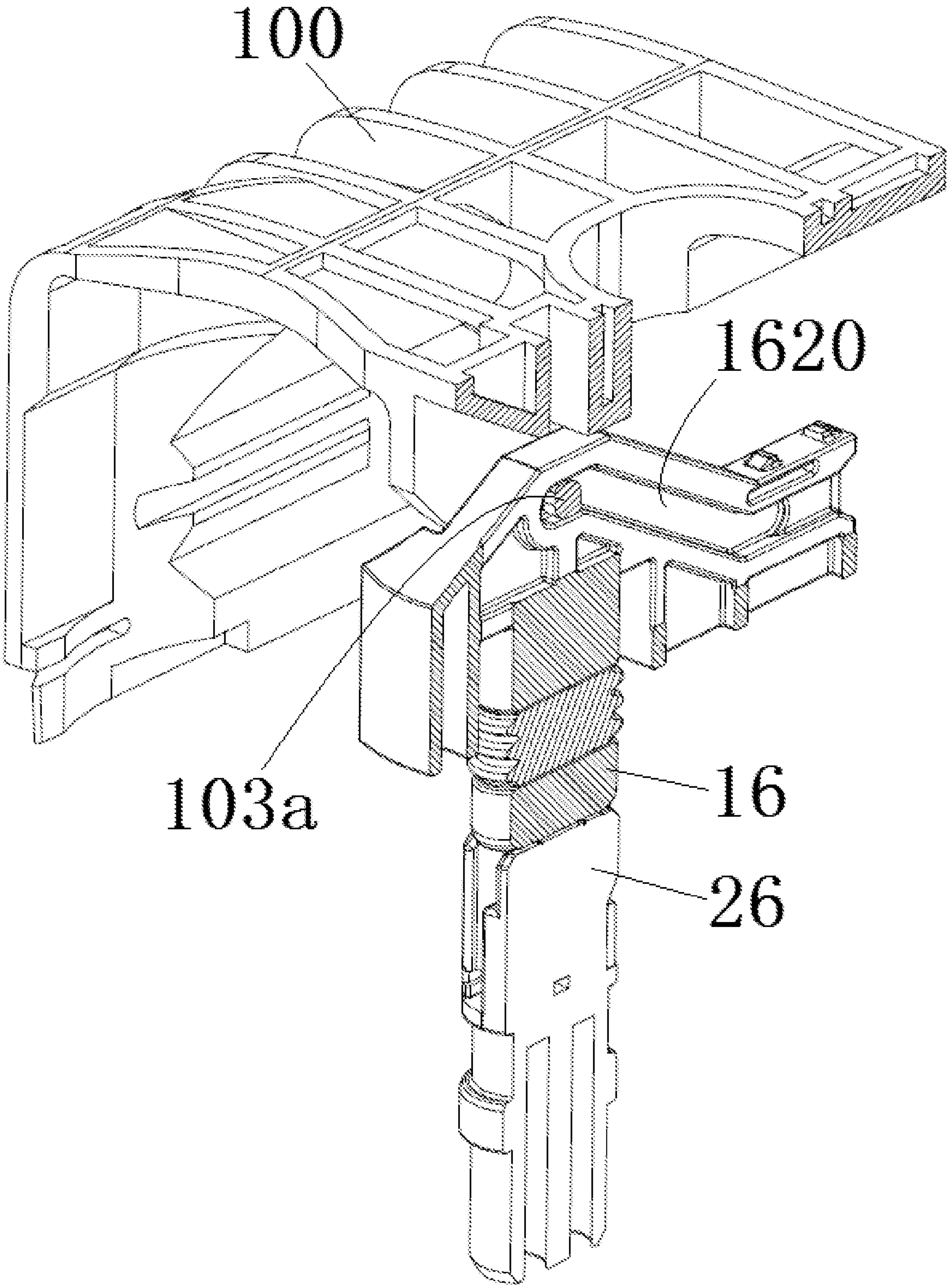
FIG. 21 shows the sectional view of the high-voltage interlock and safety cover of the connector and the mating high-voltage interlock of the mating connector according to an exemplary embodiment of the present invention, wherein the safety cover is in the safe position and the high-voltage interlock is in the connected position.

As shown in FIGS. 1 to 12, in the illustrated embodiment, an elastic cantilever 102*b* is formed on the safety cover 100, and a limit protrusion 10*d* is formed on the housing 10. As shown in FIG. 11, when the housing 10 is not mated with the mating housing 20 and the safety cover 100 is in the initial position, the elastic cantilever 102*b* is in the position of interference with the limit protrusion 10*d* to prevent the safety cover 100 from being moved from the initial position to the safe position.

As shown in FIGS. 1 to 12, in the illustrated embodiment, when the housing 10 has been mated with the mating housing 20 and the safety cover 100 is in the initial position, the elastic cantilever 102*b* is pushed by the unlocking part 20*d* on the mating housing 20 to a position that does not interfere with the limit protrusion 10*d*, so that the movement of the safety cover 100 will not be hindered by the limit protrusion 10*d*.

As shown in FIGS. 1 to 12, in the illustrated embodiment, when the housing 10 has been mated with the mating housing 20 and the safety cover 100 has been moved to the safe position, the free end of the elastic cantilever 102*b* rests against the stop part 20*b* of the mating housing 20 to limit the safety cover 100 at the safe position.

As shown in FIGS. 1 to 12, in the illustrated embodiment, a threaded hole 210 is formed on the mating terminal 21 or a threaded hole 210 is formed on the mating connection assembly 22 assembled with the mating terminal 21, and the connection assembly 11 includes a threaded connection member 110 connected to the threaded hole 210. A threaded connection hole 220 is formed on the mating housing 20, and the mechanical connection member 12 of the connector 1 has a threaded connection part 120 connected to the threaded connection hole 220.

As shown in FIGS. 1 to 12, in the illustrated embodiment, the mating connector 2 also includes an inner housing 200 made of insulation material. The inner housing 200 is installed in the mating housing 20. In the illustrated embodiment, the housing 10 and the mating housing 20 are conductive housings made of conductive material. The mating housing 20 has a flange portion 20*a* extending radially, and the threaded connection hole 220 is formed on the flange portion 20*a*.

As shown in FIGS. 1 to 16, in an exemplary embodiment of the present invention, a connector 1 is also disclosed. The connector 1 includes: a housing 10, a terminal 13, a connection assembly 11, a safety cover 100 and a high-voltage interlock 16. The housing 10 is formed with a slot 1016 and a mounting port 1011. The terminal 13 is arranged in the housing 10. The connection assembly 11 is installed in the mounting port 1011 of the housing 10 and is suitable for fastening the terminal 13 to the mating terminal 21 of the mating connector 2. The safety cover 100 is movably mounted on the housing 10 and can be moved between the initial position where the connection assembly 11 is not covered by the safety cover 100 and the safety position where the connection assembly 11 is covered by the safety cover 100. The high voltage interlock 16 is movably installed in the slot 1016 and can be moved between the connected position where the high voltage interlock 16 is engaged with the mating high voltage interlock 26 of the mating connector 2 and the disconnected position where the high voltage interlock 16 is separated from the mating high voltage interlock 26.

As shown in FIGS. 1 to 16, in the illustrated embodiment, when the connector 1 is mated with the mating connector 2, and when the connection assembly 11 is not fastened, the connection assembly 11 is in the position of interference with the safety cover 100 to prevent the safety cover 100 from being moved from the initial position to the safe position.

As shown in FIGS. 1-16 and FIGS. 19-21, in the illustrated embodiment, the safety cover 100 and the high voltage interlock 16 are connected in a sliding way to make them linked according to the following relationship: when the safety cover 100 is moved to the initial position, the high voltage interlock 16 is moved to the disconnected position; and when the safety cover 100 is moved to the safety position, the high-voltage interlock 16 is moved to the connected position.

As shown in FIGS. 1 to 21, in the illustrated embodiment, the high-voltage interlock 16 includes an insulator 161 and two detection terminals 163. The two detection terminals 163 are fixed to the insulator 161 for electrical connection to positive and negative electrodes of a high-voltage interlock circuit (not shown). When the high-voltage interlock 16 is moved to the connected position, the two detection terminals 163 of the high-voltage interlock 16 are electrically connected with the mating detection terminal 263 in the mating high-voltage interlock 26 to turn on the high-voltage interlock circuit. When the high-voltage interlock 16 is moved to the disconnected position, the two detection terminals 163 are separated from the mating detection terminal 263 to cut off the high-voltage interlock circuit.

As shown in FIGS. 1 to 21, in the illustrated embodiment, when the connector 1 is mated with the mating connector 2, and when the connection assembly 11 is not fastened, the connection assembly 11 is in the position of interference with the safety cover 100, so that the safety cover 100 cannot be moved from the initial position to the safe position. Therefore, when the connection assembly 11 is not fastened, the high-voltage interlock 16 is always in the disconnected position. Only when the connection assembly 11 is fastened, the high-voltage interlock 16 can be moved to the connected position.

As shown in FIGS. 1 to 21, in the illustrated embodiment, during mating the connector 1 with the mating connector 2, the high-voltage interlock circuit is turned on only after the high-voltage terminals (terminal 13 and terminal 21) are electrically connected; During the separation of connector 1 and mating connector 2, the high-voltage interlock circuit is cut off before the high-voltage terminals (terminal 13 and terminal 21) are separated. In this way, the high-voltage terminals (terminal 13 and terminal 21) can be avoided from being hot plugged and unplugged, and the use safety of the connector is improved.

As shown in FIGS. 1 to 21, in the illustrated embodiment, the safety cover 100 is configured to be moved between the initial position and the safety position in the first direction (the horizontal direction in the figures). The high-voltage interlock 16 is configured to be moved between the connected position and the disconnected position in the second direction (the vertical direction in the figures) perpendicular to the first direction.

As shown in FIGS. 1 to 21, in the illustrated embodiment, a guide slot **10*b* extending in the first direction is formed on one of the inner wall surface of the safety cover 100 and the outer wall surface of the housing 10, and a guide rib 102*a* extending in the first direction is formed on the other. The guide slot 10*b* is slidably mated with the guide rib 102*a* to guide the safety cover 100 to move between the initial position and the safety position in the first direction relative to the housing 10**.

As shown in FIGS. 1 to 21, in the illustrated embodiment, the slot 1016 on the housing 10 extends in the second direction, and the insulator 160 of the high-voltage interlock 16 includes the first part 161 extending in the second direction. The first part 161 of the insulator 160 is slidably mated with the slot 1016 of the housing 10 to guide the high-voltage interlock 16 to move between the connected position and the disconnected position in the second direction relative to the housing 10.

As shown in FIGS. 1 to 21, in the illustrated embodiment, the insulator 160 of the high-voltage interlock 16 also includes a second part 162 connected with the first part 161, and the second part 162 is located outside the housing 10. The detection terminal 163 is fixed to the first part 161 of the insulator 160, and the second part 162 of the insulator 160 is slidably connected with the safety cover 100.

As shown in FIGS. 1 to 21, in the illustrated embodiment, a pair of support walls 103 is formed on the inner wall surface of the top wall 101 of the safety cover 100, and a part of the second part 162 of the insulator 160 is arranged in a gap between the pair of support walls 103. A chute 1620 is formed on each side of the second part 162 of the insulator 160. The pair of support walls 103 are respectively formed with convex parts **103*a* which are slidably connected with the chutes 1620. The chute 1620 includes a main part 1623 extending a predetermined length in a direction inclined to the first direction to convert the movement of the safety cover 100 in the first direction (the horizontal direction in the figure) into the movement of the high-voltage interlock 16** in the second direction (the vertical direction in the figure).

As shown in FIGS. 1 to 21, in the illustrated embodiment, the chute 1620 also includes a first end part 1621 and a second end part 1622 which are respectively connected with the two ends of the main part 1623 of the chute 1620, and the first end part 1621 and the second end part 1622 extend in the first direction. When the safety cover 100 is moved to the initial position, the convex part **103*a* is moved to the first end part 1621 of the chute 1620. When the safety cover 100 is moved to the safety position, the convex part 103*a* is moved to the second end part 1622 of the chute 1620**.

As shown in FIGS. 1 to 21, in the illustrated embodiment, the high-voltage interlock 16 also includes a sealing ring 164. The seal ring 164 is sleeved on the first part 161 of the insulator 160 to seal the gap between the first part 161 of the insulator 160 and the slot 1016 of the housing 10.

As shown in FIGS. 1 to 21, in the illustrated embodiment, the mating connector 2 includes an inner housing 200 made of insulation material, and the mating high-voltage interlock 26 is fixedly installed in the inner housing 200. The mating high-voltage interlock 26 includes an insulator 260 and a mating detection terminal 263 arranged in the insulator 260. When the high-voltage interlock 16 is mated with the mating high-voltage interlock 26, the mating detection terminal 263 is bridged between the two detection terminals 163 to connect the two detection terminals 163.

As shown in FIGS. 1 to 21, in an exemplary embodiment of the present invention, a connector assembly is also disclosed, which includes a connector 1 and a mating connector 2 suitable for mating with connector 1. The mating connector 2 includes a mating housing 20, a mating terminal 21 and a mating high-voltage interlock 26. The mating housing 20 is suitable for mating with the housing 10 of the connector 1. The mating terminal 21 is arranged in the mating housing 20 for electrical connection with the terminal 13 of the connector 1. The mating high-voltage interlock 26 is arranged in the mating housing 20 for mating with the high-voltage interlock 16 of the connector 1.

Please note that the present invention is not limited to the illustrated embodiments. The technical solutions of the present invention apply, for example, the following two variations:

Example of the First Variation

Refer to FIGS. 1-12 above. In the first variation, a connector 1 is disclosed, which includes a housing 10, a mechanical connection member 12 and a safety cover 100. The safety cover 100 is slidably mounted on the housing 10. The mechanical connection member 12 is mounted on the housing 10 and is suitable for threaded connection with the mating housing 20 of the mating connector 2 to fasten the housing 10 to the mating housing 20. The mechanical connection member 12 has a second operation part 121 exposed from the housing 10, enabling the mechanical connection member 12 to be fastened or loosened by operating the second operation part 121.

Refer to FIGS. 1-12 above, during the mating of connector 1 and mating connector 2, when the mechanical connection member 12 is not fastened, the second operation part 121 is in the position of interference with the safety cover 100 to prevent the safety cover 100 from being moved from the initial position to the safe position.

Refer to the above FIGS. 1-12. When the mechanical connection member 12 has been fastened during the mating of connector 1 and mating connector 2, the second operation part 121 is in a position that does not interfere with the safety cover 100 to allow the safety cover 100 to be moved from the initial position to the safe position;

Refer to the above FIGS. 1-12, when the safety cover 100 is in the initial position, the second operation part 121 is not covered by the safety cover 100 to allow the mechanical connection member 12 to be fastened or loosened by operating the second operation part 121;

Refer to FIGS. 1-12 above, when the safety cover 100 is in the safe position, the second operation part 121 is covered by the safety cover 100 to prevent the mechanical connection member 12 from being loosened by operating the second operation part 121.

Example of the Second Variation

Refer to FIGS. 1-12 above, in the second variation, a connector 1 is disclosed, which includes: a housing 10, a terminal 13, a connection assembly 11 and a safety cover 100. The terminal 13 is arranged in the housing 10. The connection assembly 11 is installed in the housing 10 and is suitable for fastening the terminal 13 to a mating terminal 21 of a mating connector 2. The safety cover 100 is slidably mounted on the housing 10. The connection assembly 11 has a first operation part 111 exposed from the housing 10, which enables the connection assembly 11 to be fastened or loosened by operating the first operation part 111.

Refer to FIGS. 1-12 above, during the mating of connector 1 and mating connector 2, when the connection assembly 11 is not fastened, the first operation part 111 is in the position of interference with the safety cover 100 to prevent the safety cover 100 from being moved from the initial position to the safe position.

Refer to FIGS. 1-12 above, during the mating of connector 1 and mating connector 2, when the connection assembly 11 has been fastened, the first operation part 111 is in a position that does not interfere with the safety cover 100 to allow the safety cover 100 to be moved from the initial position to the safe position.

Refer to the above FIGS. 1-12, when the safety cover 100 is in the initial position, the first operation part 111 is not covered by the safety cover 100 to allow the connection assembly 11 to be fastened or loosened by operating the first operation part 111.

Refer to FIGS. 1-12 above. When the safety cover 100 is in the safe position, the first operation part 111 is covered by the safety cover 100 to prevent the connection assembly 11 from being loosened by operating the first operation part 111.

In the above-mentioned exemplary embodiments according to the present invention, the safety cover can not only reliably prevent the fastened connection assembly from being accidentally loosened, but also can conveniently judge whether the connection assembly have been fastened, thus improving the use safety of the connector.

In addition, in the aforementioned exemplary embodiments according to the present invention, the high-voltage interlock is linked with the safety cover, so it can be ensured that the high-voltage interlock is always in a state of separation from the mating high-voltage interlock before the terminal of the connector is electrically connected to the mating terminal of the mating connector, thus improving the use safety of the connector.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector, comprising:

a housing having a mounting port;

a connection assembly installed in the mounting port of the housing and adapted to fasten a terminal of the connector to a mating terminal of a mating connector, the connection assembly has a first operation part exposed from the housing and the connection assembly is capable of being fastened or loosened by operating the first operation part; and a safety cover slidably mounted on the housing, the first operation part is in a position of interference with the safety cover to prevent the safety cover from being moved to a safety position when the connection assembly is not fastened.

2. The connector of claim 1, wherein the first operation part is in a position that does not interfere with the safety cover to allow the safety cover to be moved between an initial position and the safety position when the connection assembly has been fastened.

3. The connector of claim 2, wherein the safety cover has a top wall with an operation hole and a pair of side walls connected to the top wall, the first operation part is located outside the safety cover when the safety cover is in the initial position.

4. The connector of claim 2, wherein an elastic cantilever is formed on the safety cover and a limit protrusion is formed on the housing, the elastic cantilever is in a position of interference with the limit protrusion to prevent the safety cover from being moved from the initial position to the safety position when the housing is not mated with the mating housing and the safety cover is in the initial position.

5. The connector of claim 4, wherein the elastic cantilever is pushed by an unlocking part on the mating housing to a position that does not interfere with the limit protrusion when the housing has been mated with the mating housing and the safety cover is in the initial position, so that movement of the safety cover will not be hindered by the limit protrusion.

6. The connector of claim 4, wherein a free end of the elastic cantilever rests against a stop part on the mating housing to limit the safety cover at the safety position when the housing has been mated with the mating housing and the safety cover has been moved to the safety position.

7. The connector of claim 1, further comprising a mechanical connection member installed on the housing and suitable for threaded connection with a mating housing of the mating connector to fasten the housing to the mating housing, the mechanical connection member has a second operation part exposed from the housing and the mechanical connection member is capable of being fastened or loosened by operating the second operation part, the second operation part is in a position of interference with the safety cover to prevent the safety cover from being moved from the initial position to the safety position when the mechanical connection member is not fastened, the second operation part is not covered by the safety cover to allow the mechanical connection member to be fastened or loosened by operating the second operation part when the safety cover is in the initial position, the second operation part is covered by the safety cover to prevent the mechanical connection member from being loosened by operating the second operation part when the safety cover is in the safety position.

8. The connector of claim 7, wherein the first operation part and the second operation part are in a position that does not interfere with the safety cover to allow the safety cover to be moved from the initial position to the safety position when the connection assembly and the mechanical connection member are fastened.

9. The connector of claim 7, wherein an operation hole is formed on the safety cover, the second operation part is exposed from the safety cover through the operation hole when the safety cover is in the initial position.

10. The connector of claim 9, wherein a limit part is formed on the inner wall surface of a top wall of the safety cover, the limit part rests against the first operation part to limit the safety cover at the safety position when the safety cover is moved from the initial position to the safety position.

11. The connector of claim 1, wherein a guide slot extending in a first direction is formed on one of an outer wall surface of the housing and an inner wall surface of the safety cover, and a guide rib extending in the first direction is formed on the other of the outer wall surface of the housing and the inner wall surface of the safety cover, the guide rib is buckled into the guide slot and is movable along the guide slot in the first direction to guide the safety cover to be moved between the initial position and the safety position relative to the housing.

12. The connector of claim 11, wherein the guide slot is formed on the outer wall surface of the housing and the guide rib is formed on the inner wall surface of a side wall of the safety cover, the guide slot has a guide surface extending in the first direction and the guide rib slides in contact with the guide surface to guide the guide rib to move in the first direction.

13. The connector of claim 1, further comprising a cable having an end inserted into the housing in a first direction and electrically connected with the terminal, and an end cover sleeved on an end of the housing and fixing the cable to the housing.

14. The connector of claim 13, wherein a cable port allowing the cable to be inserted in the first direction is formed on the end of the housing, an installation port is formed on a top of another end of the housing to allow the connection assembly to be inserted in a second direction perpendicular to the first direction, a mating port is formed on a bottom of the another end of the housing to allow the connector to mate with the mating connector in the second direction.

15. The connector of claim 13, wherein each of the safety cover and the end cover has a front end and a rear end which are opposite to each other in the first direction, a front end face of the end cover rests against a rear end face of the safety cover to limit the safety cover at the initial position when the safety cover is moved from the safety position to the initial position.

16. The connector of claim 13, wherein the housing has at least two housing units and a connection part connected between the housing units, a mounting hole is formed on the connection part and a mechanical connection member is installed in the mounting hole on the connection part, the terminal is one of a pair of terminals arranged respectively in the housing units and electrically connecting with a pair of mating terminals, the connection assembly is one of a pair of connection assemblies installed in the housing units and connecting the terminals to the mating terminals, the cable is one of pair of cables inserted into the housing units and electrically connected with the terminals, and the end cover is one of a pair of end covers sleeved on a pair of ends of the housing units to fix the cables to the housing units.

17. The connector of claim 1, wherein the safety cover is an integral molded part.

18. The connector of claim 1, wherein the terminal is arranged in the housing and electrically connected with the mating terminal.

19. A connector assembly, comprising:

the connector according to claim 1; and a mating connector matable with the connector, the mating connector includes a mating housing matable with the housing of the connector and a mating terminal disposed in the mating housing for electrical connection with the terminal of the connector.

20. The connector assembly according to claim 19, wherein the mating connector has a mating connection assembly formed with a threaded hole and the connection assembly has a threaded connection member connected into the threaded hole, a threaded connection hole is formed on the mating housing and the mechanical connection member of the connector has a threaded connection part connected into the threaded connection hole.

21. A connector, comprising:

a housing;

a mechanical connection member installed on the housing and suitable for threaded connection with a mating housing of a mating connector to fasten the housing to the mating housing; and a safety cover slidably mounted on the housing, the mechanical connection member has an operation part exposed from the housing so that the mechanical connection member is capable of being fastened or loosened by operating the operation part, the operation part is in a position of interference with the safety cover to prevent the safety cover from being moved from an initial position to a safety position when the mechanical connection member is not fastened, the operation part is in a position that does not interfere with the safety cover to allow the safety cover to be moved from the initial position to the safety position when the mechanical connection member has been fastened, the operation part is not covered by the safety cover to allow the mechanical connection member to be fastened or loosened by operating the operation part when the safety cover is in the initial position, the operation part is covered by the safety cover to prevent the mechanical connection member from being loosened by operating the operation part when the safety cover is in the safety position.

* * * * *